(12) United States Patent
Krapp et al.

(10) Patent No.: US 10,763,957 B2
(45) Date of Patent: Sep. 1, 2020

(54) METHODS AND SYSTEMS FOR SUPPORTING REDUNDANCY AND OUTAGE RESOLUTION IN COAXIAL NETWORKS WITH IDEAL TAPS

(71) Applicant: MaxLinear, Inc., Carlsbad, CA (US)

(72) Inventors: Steven J. Krapp, Naperville, IL (US);
Sridhar Ramesh, Carlsbad, CA (US);
Curtis Ling, Carlsbad, CA (US);
Leonard Dauphinee, Irvine, CA (US);
Kenneth S. Walley, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 16/659,170

(22) Filed: Oct. 21, 2019

(65) Prior Publication Data
US 2020/0127732 A1    Apr. 23, 2020

Related U.S. Application Data

(60) Provisional application No. 62/748,426, filed on Oct. 20, 2018.

(51) Int. Cl.
| | |
|---|---|
| *H04B 10/00* | (2013.01) |
| *H04B 10/038* | (2013.01) |
| *H04B 10/25* | (2013.01) |
| H04J 14/00 | (2006.01) |

(52) U.S. Cl.
CPC ....... *H04B 10/038* (2013.01); *H04B 10/2504* (2013.01)

(58) Field of Classification Search
CPC .. H04B 10/25751; H04H 60/96; H04H 60/97; H04H 20/78; H04H 20/79
See application file for complete search history.

(56) References Cited

U.S. PATENT DOCUMENTS 6,901,605 B1 * 5/2005 Sugiura ................ H04H 20/76
348/E7.075
7,126,417 B2 * 10/2006 Bishop ...................... G01S 1/00
330/51

* cited by examiner

*Primary Examiner* — Daniel G Dobson
(74) *Attorney, Agent, or Firm* — Maschoff Brennan

(57) ABSTRACT

Systems and methods are provided for supporting redundancy and outage resolution in coaxial networks with ideal taps.

20 Claims, 28 Drawing Sheets

METHODS AND SYSTEMS FOR SUPPORTING REDUNDANCY AND OUTAGE RESOLUTION IN COAXIAL NETWORKS WITH IDEAL TAPS

CLAIM OF PRIORITY

This patent application makes reference to, and claims priority from U.S. Provisional Patent Application Ser. No. 62/748,426, filed on Oct. 20, 2018. The above identified application is hereby incorporated herein by reference in its entirety.

This patent application also relates to:
U.S. patent application Ser. No. 16/000,491, filed on Jun. 5, 2018; and
U.S. patent application Ser. No. 16/128,213, filed on Sep. 11, 2018.

Each of the above identified applications is hereby incorporated herein by reference in its entirety.

TECHNICAL FIELD

Aspects of the present disclosure relate to communication solutions. More specifically, certain implementations of the present disclosure relate to methods and systems for supporting redundancy and outage resolution in coaxial networks with ideal taps.

BACKGROUND

Various issues may exist with conventional approaches for designing and implementing cable networks, particularly coaxial cable based networks. In this regard, conventional systems and methods, if any existed, for designing and implementing coaxial cable plants can be costly, inefficient, and/or ineffective.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for supporting redundancy and outage resolution in coaxial networks with ideal taps, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Figure 1:
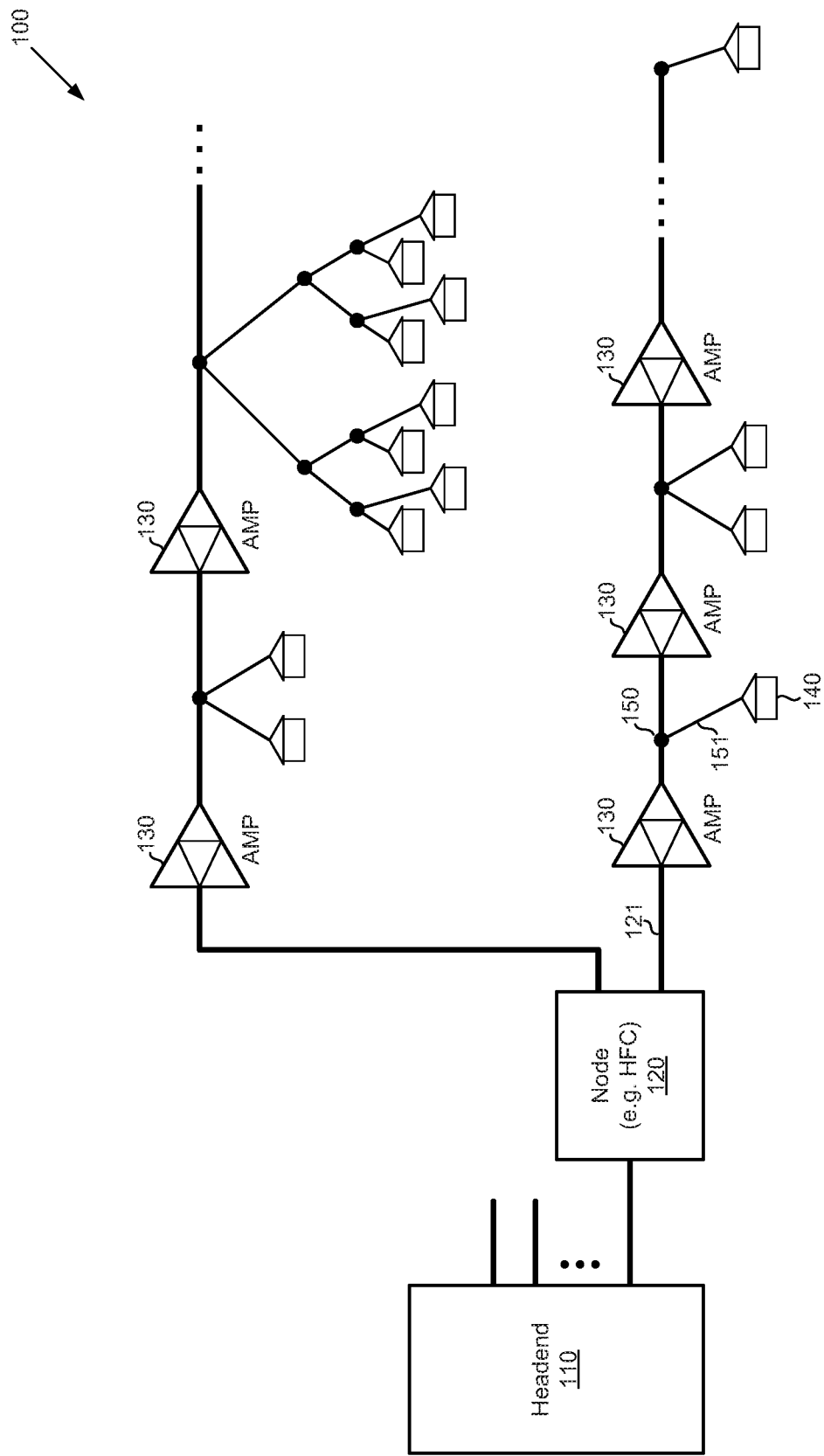
FIG. 1 illustrates an example cable network.

FIG. 1 illustrates an example cable network. Referring to FIG. 1, there is shown a plant 100, which may correspond to an example cable network distribution plant. The plant 100 may be a hybrid fiber-coaxial (HFC) based plant.

The plant 100 may comprise a headend 110, connected to one or more distribution (e.g., HFC) nodes 120, with each node 120 connecting to plurality of user equipment (e.g., customer premise equipment (CPE), such as data over cable service interface specification (DOCSIS) modems (or cable modems (CMs)), television set-top boxes, etc.) 140 residing in customers' (subscribers') premises.

The headend 110 may comprise suitable circuitry for supporting headend operations and/or functions. For example, the headend 110 may support several heterogeneous services (e.g., DOCSIS, video on demand (VOD), switched digital video (SDV), out-of-band control signals (OOB), broadcast analog and/or digital television based services, etc.) and may be operable to generate downstream signals combining content (e.g., video or other data) from the different supported services, for communication over HFC based distribution network to end-user equipment (e.g., CPEs 140).

The node 120 may comprise suitable circuitry for converting signals between the headend 110 and the CPEs 140. In this regard, node(s) 120 may facilitate communication of downstream (DS) signals to the users and communication of upstream (US) signals from the end users to the headends. Accordingly, within the cable plant, each node 120 is a source of downstream (DS) signals and a sink of upstream (US) signals, whereas each CPE 140 is a source of upstream (US) signals and a sink of downstream (DS) signals. The node 120 may convert, for example, optical signals to electrical signals in the downstream (from the headend 110), and may convert electrical signals to optical signals in the upstream (to the headend 110).

The node(s) 120 may communicate with the CPEs 140 over coaxial cables, which may comprise "trunk coax" connections 121 that the user equipment may be connected to via "drop coax" connections 123. In this regard, bidirectional line amplifiers 130 may be utilized, being placed in the coaxial connections between each node 120 and the CPEs 140 coupled thereto. The placement of the amplifiers 130 may be determined in adaptive manner (e.g., based on a determination of where application of amplification may be needed, such as based on distance and/or number of CPE(s) in each amplification stage). Each of the amplifiers 130 may comprise circuitry for providing amplification bidirectionally (i.e., in both directions—that is, upstream and downstream). For example, each amplifier 130 may apply amplification gain to upstream and downstream signals between the node 120 and the CPEs 140 coupled to it. In this regard, each of the amplifiers 130 may be configured to apply different amplification gain in the upstream and downstream direction.

Further, taps 150 may be used for coupling the user equipment to the truck coax connections 121. In this regard, taps are implemented in existing networks as passive devices that are used to split DS signals and combine US signals, to connect a plurality of homes to the coax network, and to propagate signals to/from the next tap.

In an example implementation, the plant 100 may be configured such that devices and/or systems downstream from the headends (e.g., the node 120, one or more of the amplifiers 130, and/or one or more of the CPEs 140 may be implemented as 'intelligent' platforms, such as to enable monitoring and reporting (e.g., of control information) to the headends—e.g., monitoring upstream and/or downstream activities, reporting signal characteristics, etc. For example, the node 120, one or more of the amplifiers 130, and/or one or more of the user equipment in customer premises 140 may incorporate cable modem (or a reduced complexity/functionality cable modem) functions, with each cable modem function comprising a full-spectrum capture, for capturing and reporting frequency-domain snapshots of the HFC plant.

Certain issues and/or limitations may be present in existing cable networks. For example, existing coaxial networks may utilize high gain amplification of signals in order to overcome the inherent losses of the network. In this regard, amplifiers (e.g., amplifiers 130 in plant 100) may be added after a number of taps to boost and re-equalize signals after the signal level becomes too low. Despite its success and widespread use, however, use of high gain amplification has its limitations. For example, amplifiers add noise. Further, because amplifiers are active components, they require power. Existing amplifiers have typically not been monitorable. In addition, to accommodate use in the bidirectional environment of the cable networks, amplifiers require diplexers to segregate the US signals from the DS signals. In this regard, diplexers are fixed elements that must be replaced in order to change the ratio of US and DS spectrum. Further, amplifiers are fixed in the spectrum that they can address.

Thus, various implementations in accordance with the present disclosure may enhance performance and optimize use of cable networks. For example, ideal taps may be used to optimize use of coaxial connections, particularly with respect to the amplification and related adjustments typically required to facilitate communication of signals over such coaxial connections. Further, new coaxial designs and network plans that incorporate use of such ideal taps, as low gain low noise amplifiers for example, to enhance performance. This is a net result of deploying the taps in distributed fashion as each tap is required to provide only enough gain to overcome a single segment of coaxial cable of modest length.

The low gain allows for greater linearity in the amplification of the signal, which provides improved efficiency. The ideal tap also provides high isolation and return loss. In addition to improving coaxial network planning and design, use of such ideal taps may reduce operational burden and allow for improved troubleshooting during use of the cable networks.

Figure 2:
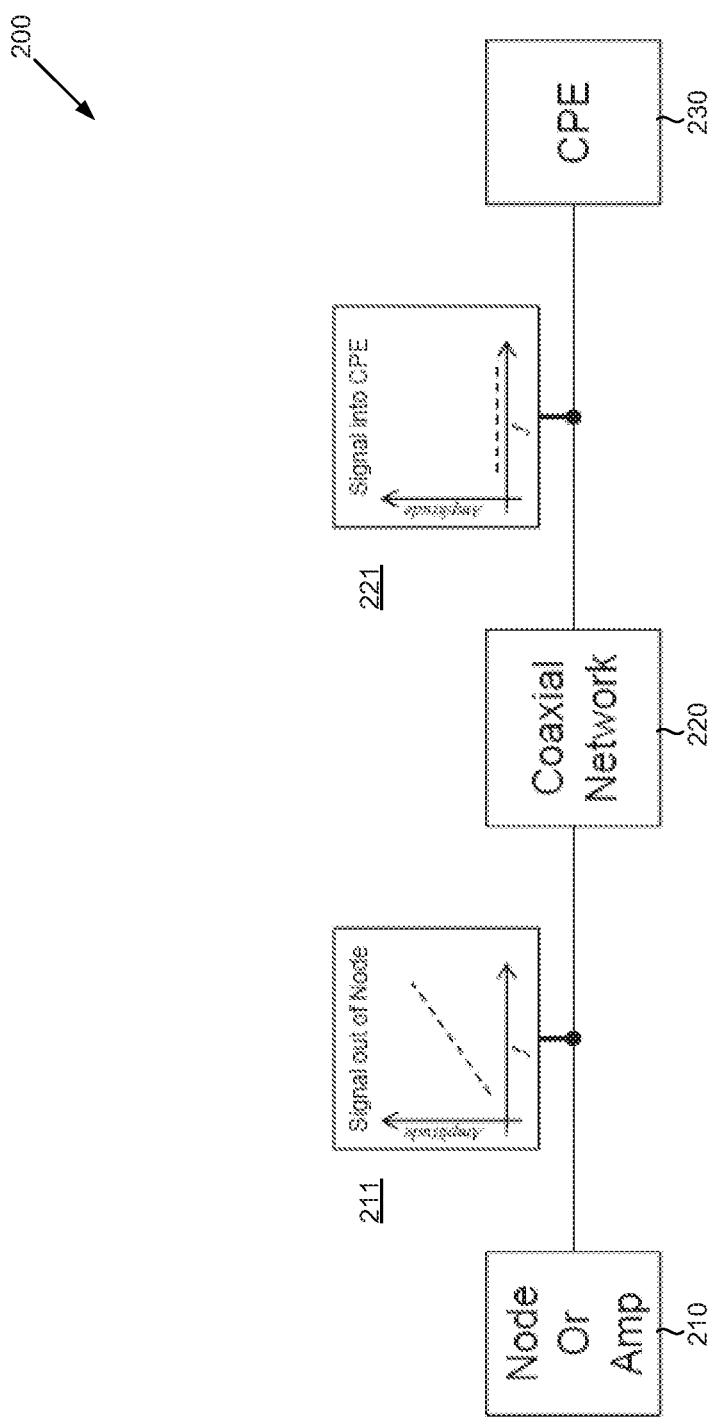
FIG. 2 illustrates an example coax design in existing networks.

FIG. 2 illustrates an example coax design for use in existing networks. Shown in FIG. 2 is a (portion of) cable plant 200 implemented in accordance with traditional coax design.

The cable plant 200 comprises a node (or amplifier) 210 communicating signals to a customer-provided equipment (CPE) 230 via coaxial network (cabling) 220. Coaxial cables naturally exhibit a "coaxial loss" (to the signals communicated via the coaxial cables), which is typically a function of frequency and length. For example, coaxial loss may be expressed as:

$$\text{coaxial loss} \sim= \text{sqrt}(f)*\text{length}+K$$

where f is frequency of the signal traversing the cabling, "length" is the length of coaxial cable, and K is a constant give for a specific cable construction.

This "coaxial loss" may cause issues, particularly for certain conditions. For example, in long setups (e.g., with large "length"), such uneven loss may create large variations between signals having low frequencies and those having high frequencies. In accordance with traditional coax design based approaches, such losses are accounted for, such as by compensating through equalization at signal launch. For example, the output of the node or the CPE may be pre-emphasized with more power at higher frequencies. This is referred to as an "up-tilt" or just "tilt."

With reference to the particular implementation shown in FIG. 2, the output of the node (or amplifier) 210 is configured to incorporate a tilt into its output signal (as shown in signal chart 211). In this regard, the amount of "tilt" is dependent upon various factors, such as the length of cable (to the target CPE), the end-of-line desired signal level, and the frequency width of the signals used for communication. The tilt is designed such that the signal is relatively flat (e.g., as shown in signal chart 221) when received at the CPE.

Because individual CPEs are connected to the coaxial network at different locations, each CPE may have a unique transfer function from the nearest node (or amplifier). In traditional coax designs, to compensate for this uniqueness in transfer function, CPEs may be grouped onto taps which serve multiple CPEs; with each tap having a particular corresponding tap value that adds loss to minimize the difference seen by an individual CPE; and each tap may also have a slot in which additional equalization can be added. In a well-designed system the transfer function from the node to each of the CPE is nearly identical. This is illustrated in FIG. 3.

Figure 3:
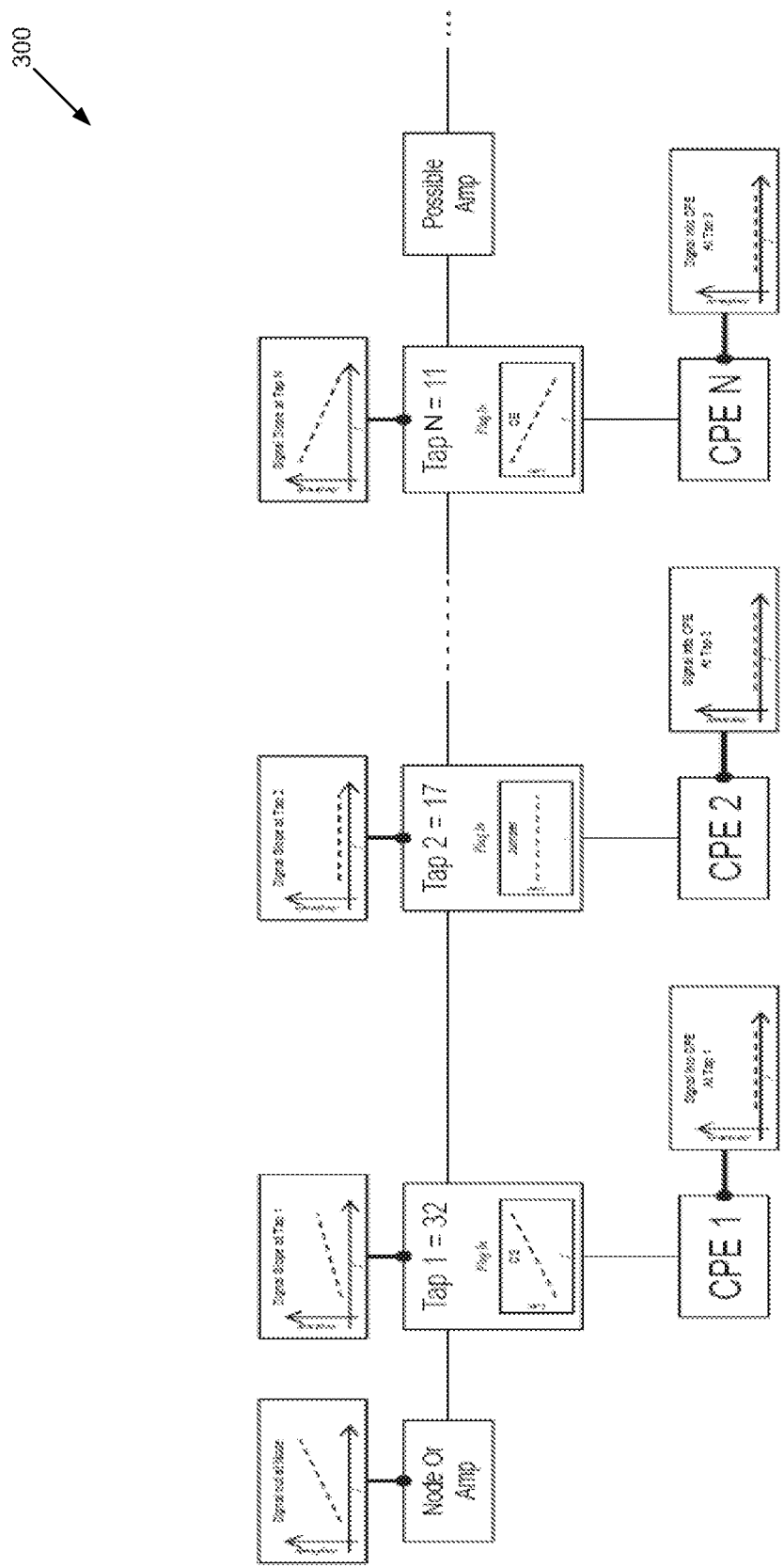
FIG. 3 illustrates signal profiles at different points in a coax segment of an example cable network implemented in accordance with traditional coax design.

FIG. 3 illustrates signal profiles at different points in a coax segment of an example cable network implemented in accordance with traditional coax design. Shown in FIG. 3 is a (portion of) cable plant 300 implemented in accordance with a traditional coax design.

In this regard, the cable plant 300 comprises a plurality of taps, each used for coupling one or more CPEs to the coaxial cable network. As noted above, with traditional coax design, each tap may be assigned a unique tap value. In this regard, the "tap value" may be the amount of passive loss a tap imparts across—that is, from the tap input port (tap-in) to the tap drop ports. Taps come with different values. In this regard, the further a tap is in the system the lower the tap value specified in the design is. Taps may also be configured to provide (e.g., via plug-in modules) frequency dependent equalization via passive components. As with the tap values, with traditional cable design, taps may have different equalization characteristics. For example, some taps may incorporate a Cable Equalizer (CE), configured for more loss at low frequencies (e.g., to counteract the effect of the coaxial cable); a Cable Simulator (CS), configured for more loss at high frequencies (e.g., to simulate a longer length of coaxial cable); or a "Jumper," configured for flat response with little to no loss (e.g., for use when no conditioning is needed). Thus, in the example cable plant 300 shown in FIG. 3, Tap 1 (near the node or amplifier) has a CS plug-in; Tap 2 has a Jumper plug-in; and Tap N (near the end of the cable, before the next amplifier) has a CE plug-in, to ensure that the CPE(s) connected to each of these taps receive substantially similar flat signals.

Various issues and limitations exist with traditional coax design. In particular, a lot of expertise and knowledge is required to design a proper system, specifically when determining coaxial losses and required adjustments at different points in the network to counteract the effects of these losses. Also, there are a finite set of tap, CE, and CS values. As a consequence, not all CPEs receive flat signals, particularly in situations where there are multiple CPEs connected to the same tap (e.g., not all premises attached to the same tap have the same length of cable); rather, some CPEs may receive signals with some tilt (e.g., 3 to 6 dBs). Even with infinite choice for tap, CE, and CS values, the length of cable between the tap and the home will vary the system transfer function.

In addition, taps have low isolation. In this regard, neighboring CPE may "hear" each other. This low isolation causes various problems—e.g., makes full-duplex (FDX) systems near impossible at the CPE, and makes time-division duplexing (TDD) systems (e.g., such as MoCA based systems) difficult to deploy and use, and/or necessitate use of particular solutions to counteracts such issues (e.g., filters are added to a CPE to prevent its MoCA transmissions from being heard by its neighbors). Further, taps have low return loss. In this regard, as a consequence of such low return loss complicated Micro-reflections are ever present creating inter-symbol interference (ISI), and FDX becomes difficult as multiple echoes from multiple taps need to be tracked and canceled.

In addition, because taps are also passive components, various use limitations may exist. For example, taps cannot be monitored remotely, cannot change configuration remotely (e.g., ports enable/disable), cannot block ingress noise, and cannot notch out undesired spectrum. Power consumption may also be high in traditional coax designs. In this regard, high output power is required at the node and CPE to overcome large plant losses (e.g., 74 dBmV total composite power (TCP) at the node and 65 dBmV TCP at the CPE). CPEs (or particular components therein, such as amplifiers) may consume 5 W, and possibly twice as much as this when FDX becomes available. All CPEs must transmit at high power (including those close to the nodes or amplifiers). Nodes (or particular components therein, such as amplifiers) may consume 18 W or more per 32 households passed (HHP).

In addition, modulation error ratio (MER) performance may be low (e.g., node fidelity is limited to about 41 dB with current technology to achieve the needed output power), HHP per segment may be low (e.g., typically 30 to 50 HHP), frequency allocation for US and DS directions may be fixed by physical diplexers, and allocation is the same for all CPE in the system (e.g., CPE which use different splits suffer degraded performance.

Many of these issues (and more) may be overcome by use of "ideal" taps, as described below. In this regard, such ideal taps may have characteristics that address some of the issues associated with traditional coax designs and/or obviate the need for some of the added measures (e.g., tilt and related adjustments) or components (e.g., plug-in modules) required in these designs, as explained in more detail below.

Figure 4:
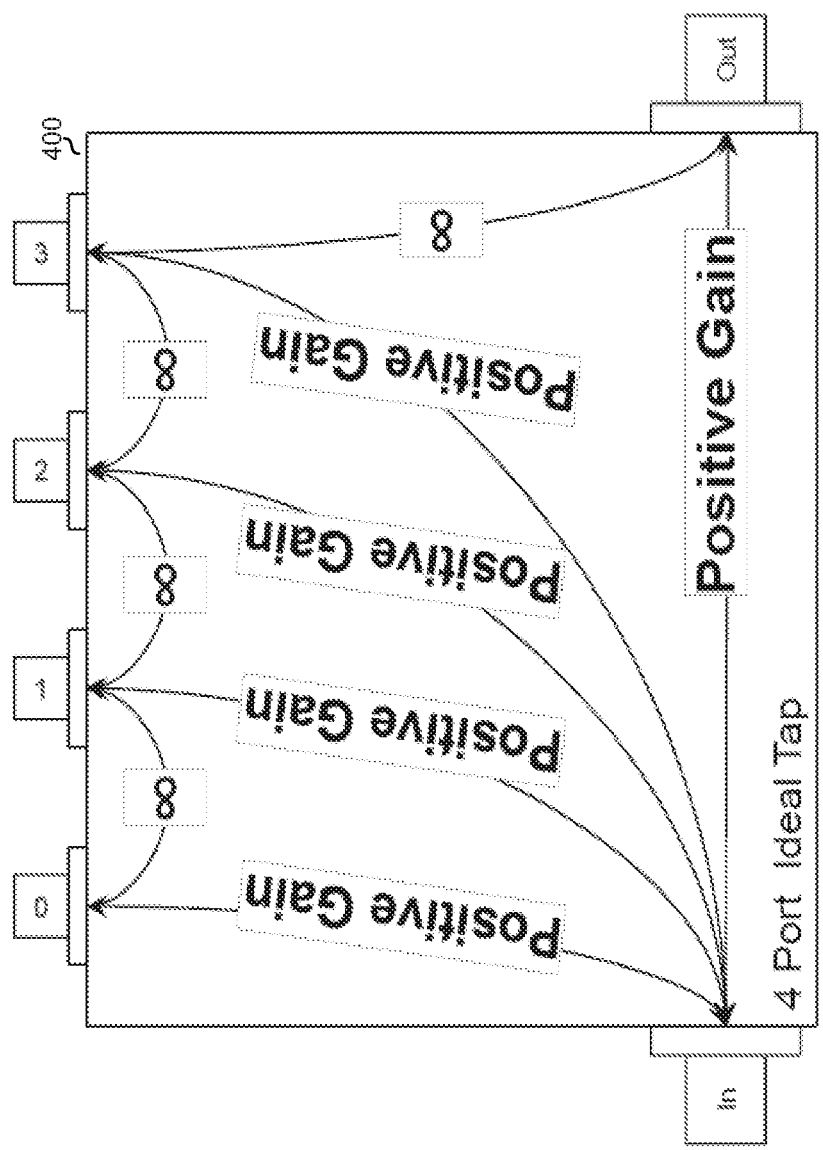
FIG. 4 illustrates performance profile of an example N-port ideal tap.

FIG. 4 illustrates performance profile of an example N-port ideal tap. Shown in FIG. 4 is an N-port (e.g., 4 ports, as shown in FIG. 4) ideal tap 400.

The ideal tap 400 may comprise suitable circuitry for providing tap-related functions in cable networks—e.g., allowing coupling of CPEs to coax cable networks (particularly to the trunk coax portions). As shown in FIG. 4, the ideal tap 400 is a 4-port tap—that is, with 6 ports: an "in" port (or "in-port"), an "out" port (or "out-port"), and 4 "drop" ports (or "drop-ports"). In this regard, the drop-ports are used for coupling CPEs into the coax network. Nonetheless, it should be understood that the disclosure is not limited to the use of 4 drop-ports, and that a different number of drop-ports can be used in different implementations. Similarly, an ideal tap may have more than one in-port and/or more than one out-port.

In particular, the ideal tap 400 may be designed and configured as an "ideal" tap—that is, having characteristics that provide ideal performance, thus overcoming at least some of the limitations and/or issues noted above with respect to traditional coax design.

In this regard, an ideal tap may have, for example, infinite band pass, infinite isolation, infinite return loss, an in-any (e.g., from the in-port to any of the 4 drop-ports or to the out-port) gain that is enough to overcome loss in the coaxial drop cable from the CPE to the tap (e.g., up to ~200 feet), an out-in (e.g., from the out-port to the in-port) gain that is enough to overcome loss in trunk cable attached between taps (e.g., up to ~200 feet), can remove undesired signals, can disable/enable ports remotely, can communicate information related to itself (e.g., status, metrics, etc.), consumes no (or minimal) power, does not add noise, and can remove noise. Example implementations of such ideal taps are described with respect to FIGS. 5 and 6.

Figure 5:
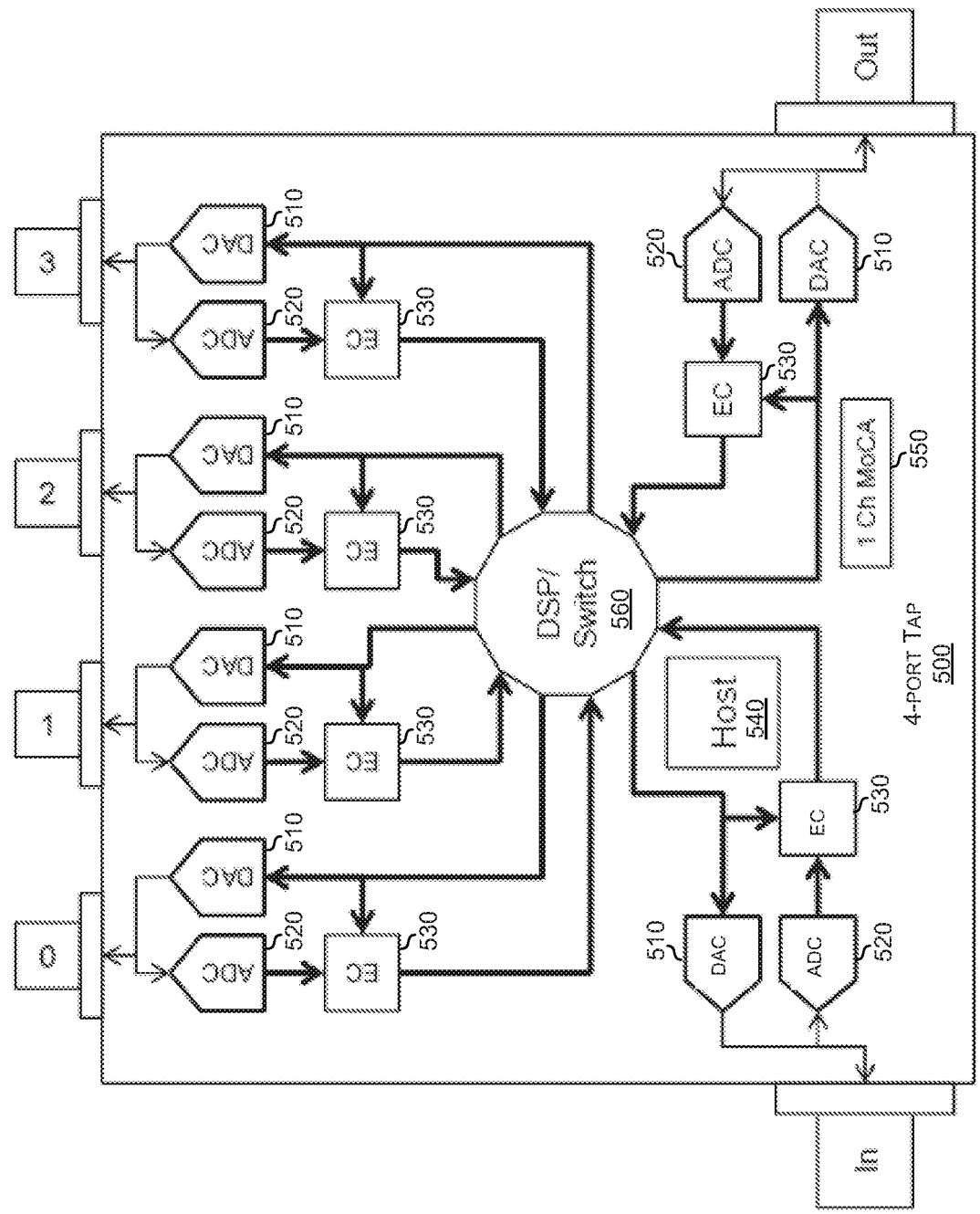
FIG. 5 illustrates an implementation on an example N-port ideal tap.

FIG. 5 illustrates an implementation on an example N-port ideal tap. Shown in FIG. 5 is an N-port (e.g., 4-port as shown in FIG. 5) ideal tap 500.

The ideal tap 500 may comprise suitable circuitry for providing tap-related functions in cable networks, and to particularly do so as an "ideal" tap as described above with respect to FIG. 4 for example. As with the ideal tap 400, the ideal tap 500 is also shown as a 4-port tap—that is, with an in-port, an out-port, and 4 drop-ports.

The ideal tap 500 may comprise circuits for processing signals received and transmitted via each of the ports, such as digital-to-analog converter (DAC) circuits 510, analog-to-digital converter (ADC) circuits 520, and echo cancellation (EC) circuits 530, which may be arranged in the manner shown in FIG. 5. In this regard, the EC circuits 530 are used for cancelling echo on each port as echoes do not propagate as such so echo cancellation only needs to accommodate—e.g., for at most 1000' of cable.

The ideal tap 500 may further comprise a host processor 540, a Multimedia over Coax Alliance (MoCA) controller 550, and a digital signal processor (DSP)/switch 560. The host processor 540 may comprise suitable circuitry for managing and controlling the tap 500 and operations thereof. The MoCA controller 550 may comprise suitable circuitry for facilitating MoCA based communication (e.g., using 1 channel). The disclosure is not limited to MoCA communication and MoCA is only shown as an example communications channel, however, and as such, the controller 550 could also be a DOCSIS cable modem or any other modem that communicates via RF over coaxial cable, etc. The DSP/switch 560, which may comprise suitable circuitry for performing digital signal processing functions, as well as handling switching within the ideal tap 500. In this regard, switching within the tap comprises providing signal paths and/or routing signals within the ideal tap 600 between the different ports.

The ideal tap 500 may be configured to enable and support bandwidth of 1.2 Gbps minimum, and a goal bandwidth of 3 to 6 Gbps. Further, with 10 bps/Hz a bandwidth of 30 to 60 Gbps may be achieved. The ideal tap 500 may also be configurable to have a high return loss (e.g., 30 to 50 dB) and high port-to-port isolation (e.g., 50 to 70 dB), low power consumption (e.g., less than 5 W). The ideal tap 500 may be configured to utilize IEEE 1588. Further, along with the performance improvements, the ideal tap 500 may also have economic advantages.

Figure 6:
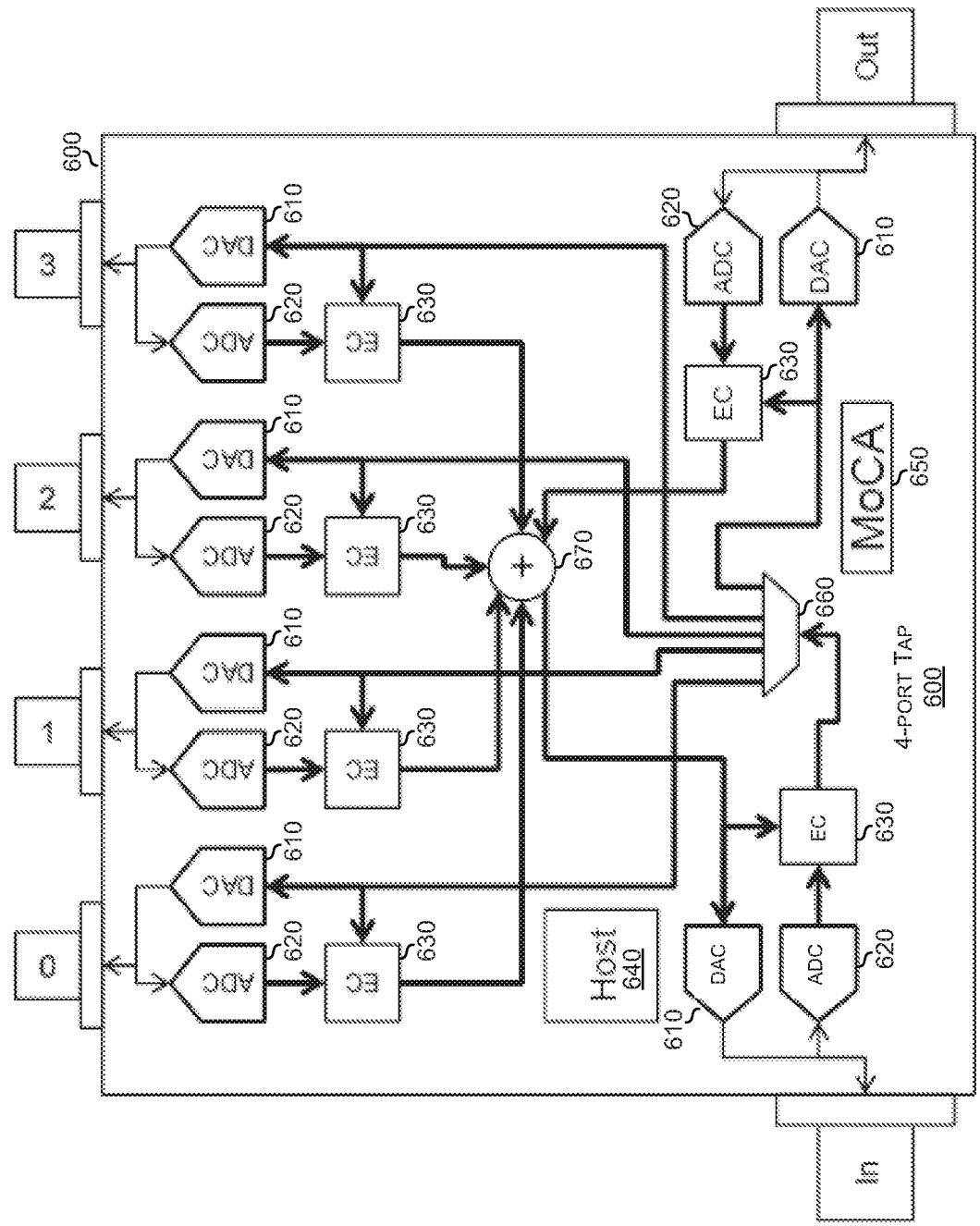
FIG. 6 illustrates an implementation on another example N-port ideal tap.

FIG. 6 illustrates an implementation on another example N-port ideal tap. Shown in FIG. 6 is an N-port (e.g., 4-port as shown in FIG. 6) ideal tap 600.

The ideal tap 600 may comprise suitable circuitry for providing tap-related functions in cable networks, and to particularly do so as an "ideal" tap as described above with respect to FIGS. 4 and 5 for example. As with the ideal tap 500, the ideal tap 600 is also shown as a 4-port tap—that is, with an in-port, an out-port, and 4 drop-ports.

The ideal tap 600 may be substantially similar to the ideal tap 500 described above, for example. Thus, the ideal tap 600 may similarly comprise digital-to-analog converter (DAC) circuits 610, analog-to-digital converter (ADC) circuits 620, and echo cancellation (EC) circuits 630, which may be utilized for processing signals received and transmitted via each of the ports, with these circuits being arranged in substantially the same manner, as shown in FIG. 6, and which may be arranged in the manner shown in FIG. 6.

Further, the ideal tap 600 may similarly comprise a host processor 640 and a Multimedia over Coax Alliance (MoCA) controller 650, which may be substantially similar to (and function similarly as) the host processor 540 and the MoCA controller 550 of the ideal tap 500 described with respect to FIG. 5. However, the ideal tap 600 may utilize a different design for handling switching within the tap. In this regard, the ideal tap 600 may utilize a multiplexer 660 and a combiner 670, for handling switching functions within the ideal tap 600 (e.g., providing signal paths and/or routing signals within the ideal tap 600 between the different ports). Nonetheless, the ideal tap 600 may be configured similar to the ideal tap 500, and may have substantially similar characteristics (e.g., bandwidth, cost, power consumption, etc.) as described above.

Figure 7A:
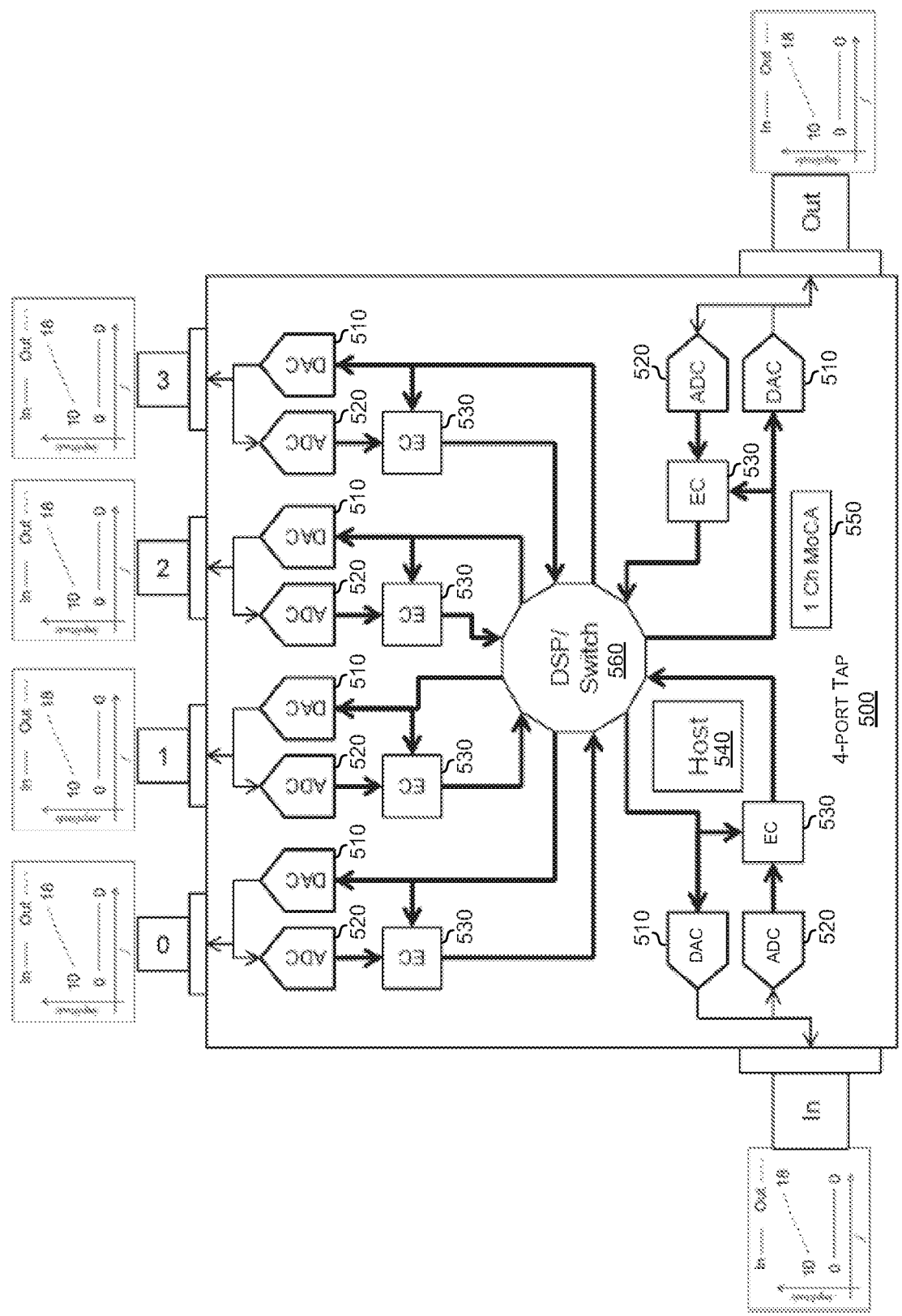
FIG. 7A illustrates use of an example N-port ideal tap.

FIG. 7A illustrates use of an example N-port ideal tap. Shown in FIG. 7A is an ideal tap in accordance with the present disclosure (specifically, an instance of the ideal tap 500 described with respect to FIG. 5, for example).

Illustrated in FIG. 7A are characteristics of input and output signals of ideal taps during use (e.g., in cable networks). In this regard, target input to all ports in the ideal tap is around 0 dBmV flat (but this may vary based on cable length), and in response to such target inputs, output on all ports may be 10 dBmV to 18 dBmV (however, this may be scaled based on cable length and total frequency span of the system). The output on each port may be directly driven from a DAC with the need for little to no additional amplification or an isolation amp may be used that has unity gain.

Figure 7B:
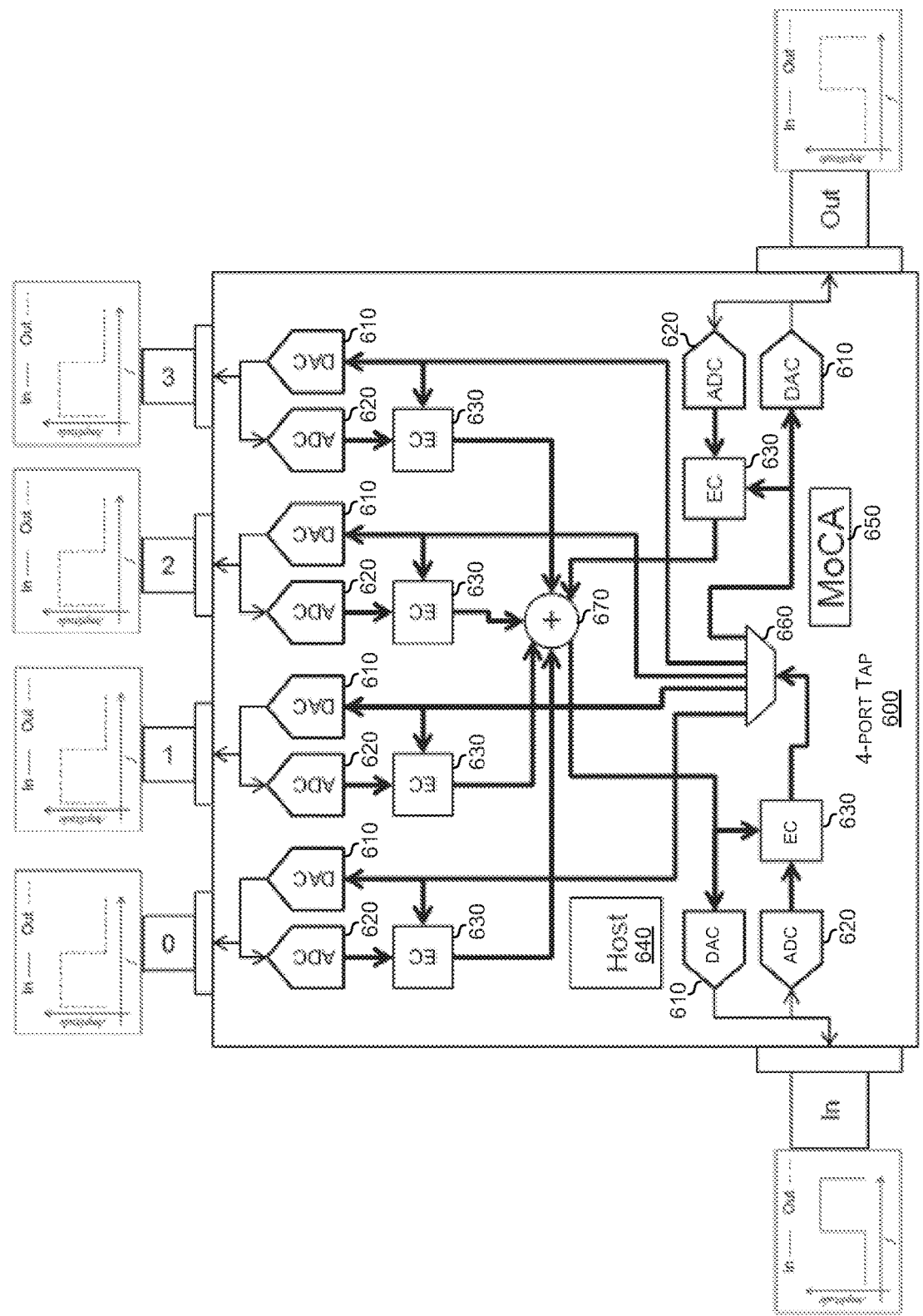
FIG. 7B illustrates use of an example N-port ideal tap to provide frequency shift spectrum.

FIG. 7B illustrates use of an example N-port ideal tap to provide frequency spectrum shift. Shown in FIG. 7B is an ideal tap in accordance with the present disclosure (specifically, an instance of the ideal tap 600 described with respect to FIG. 6).

Illustrated in FIG. 7B is use of ideal taps (e.g., in cable networks) to provide frequency spectrum shift. In this regard, a portion of the frequency spectrum may be down-converted or up-converted. For example, in the particular use scenario shown in FIG. 7B, the input signal into the in-port (i.e., signal coming into the tap) may be a high frequency signal.

The ideal tap may be configured (e.g., by adjusting functionality or control parameters applicable in each of the switching paths) such that this input signal may be down-converted to low frequency signals for one or more of the tap drop-ports (e.g., tap drop-ports 0-3 in the particular implementation shown in FIG. 7B), whereas the signal propagated from the out-port may remain similar to the input signal.

The capability to provide frequency spectrum shift may be utilized, for example, for a frequency stacking system. In this regard, use of frequency spectrum shift may allow ensuring that full band leaves the node, with a different portion of the band being consumed by each of the different taps. Thus, multiple 5-1218 MHz HFC systems for example, may ride on the same trunk cable. In this regard, each of these HFC systems may be up-shifted at the node and downshifted at participating ports. Further, HFC service groups (SGs) may be decoupled from nodes and the physical layout of the coaxial portion of the HFC system.

Figure 8A:
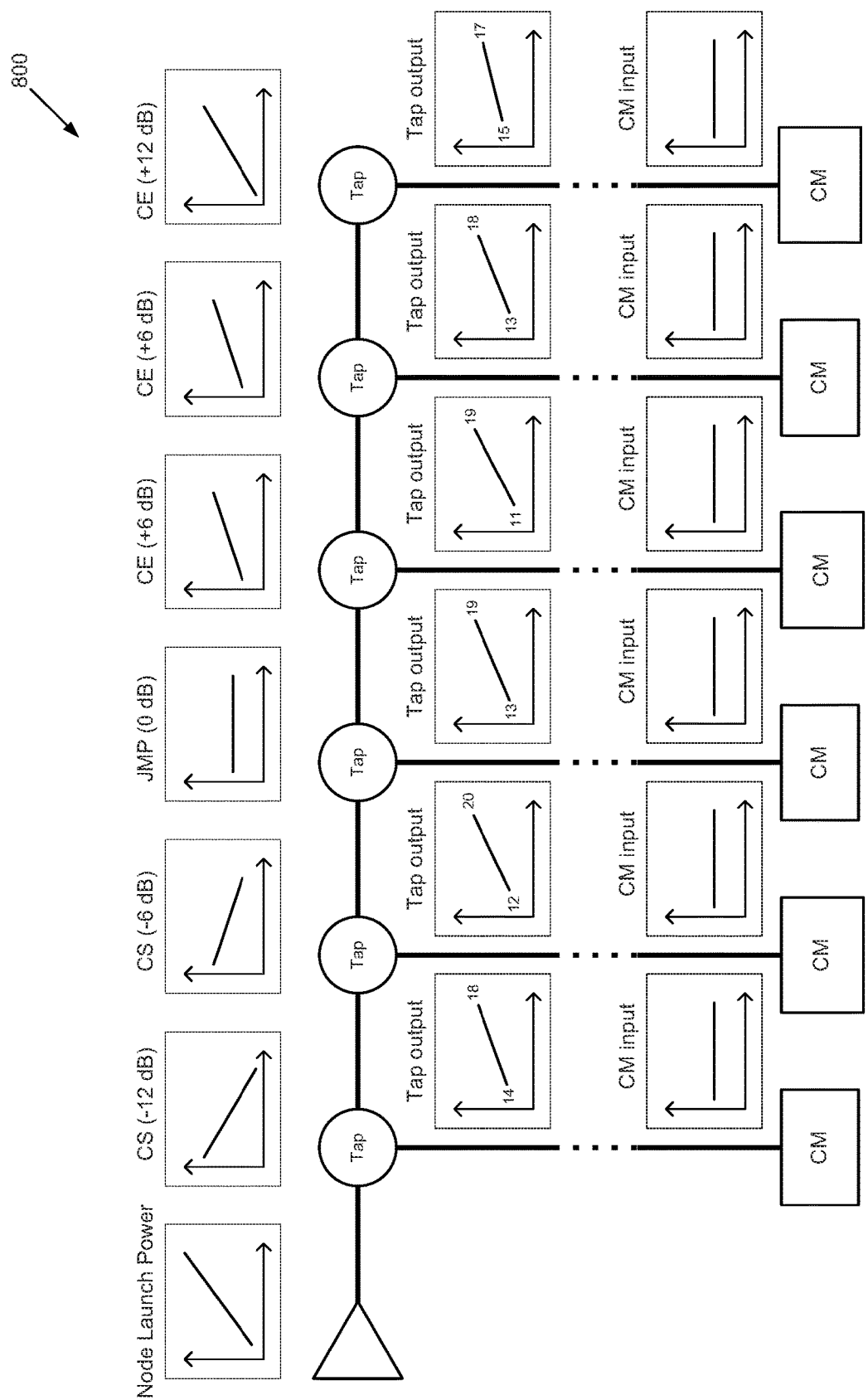
FIGS. 8A and 8B illustrate example modifications in coax design when utilizing ideal taps instead of existing taps.
Figure 8B:
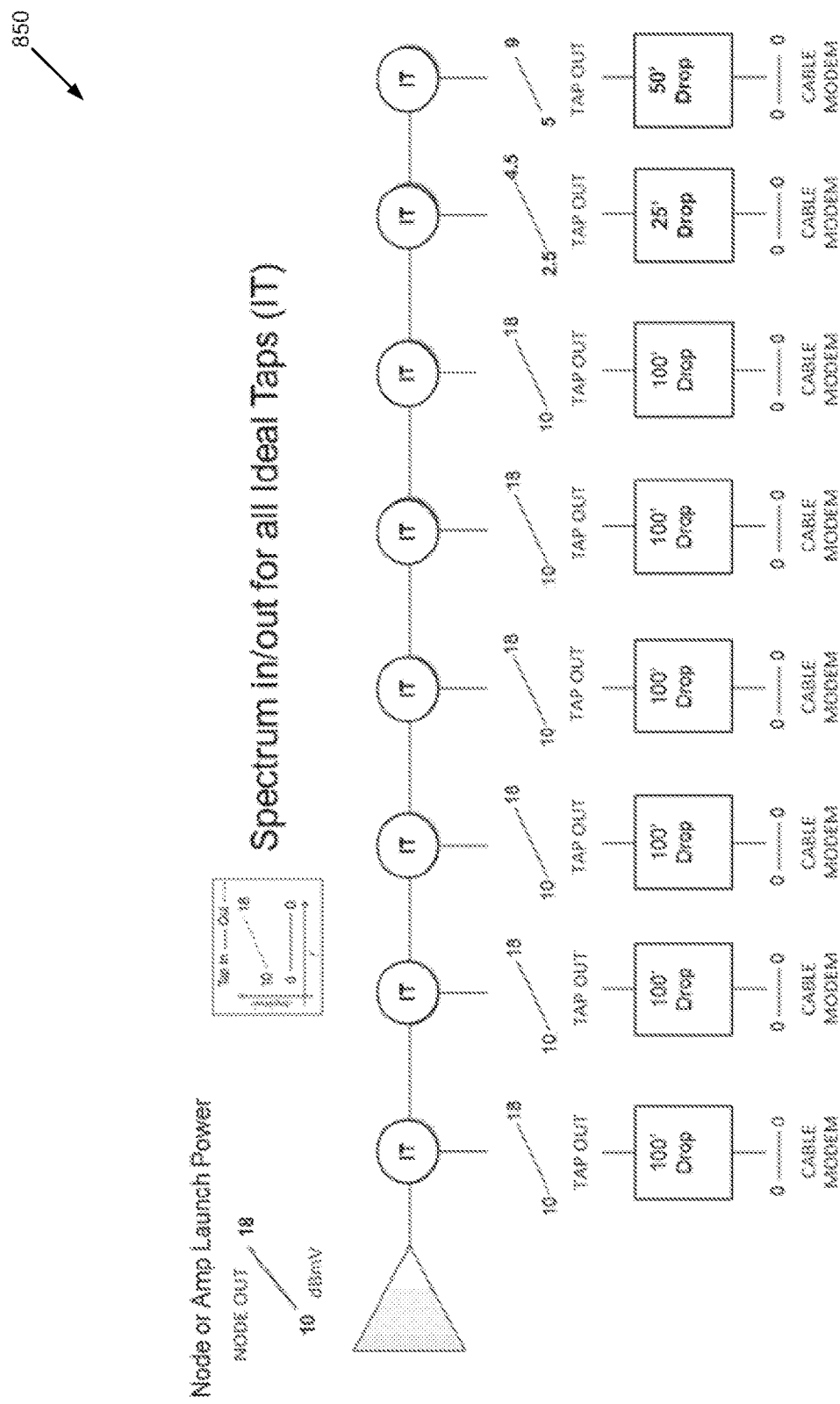

FIGS. 8A and 8B illustrate example modifications in coax design when utilizing ideal taps instead of existing taps. Shown in FIGS. 8A and 8B are example cable setups 800 and 850, respectively. In this regard, cable setup 800 represents an example setup when traditional cable designs are utilized whereas cable setup 850 represents re-implementation of the same setup (e.g., providing similar performance as far as the cable modems (CMs) of the network are concerned) when using an ideal taps based design.

As illustrated in FIG. 8A, in cable setup 800, because the taps used therein are not ideal taps, the setup design must account for coaxial losses, such as by compensating through equalization at the nodes (or amplifiers). Further, some of the taps would have to incorporate different equalization modules or plug-ins—e.g., cable simulators (CS) plug-ins in taps where negative equalization is needed; cable equalizers (CE) plug-ins in taps where positive equalization is needed; and jumpers (JMP) plug-ins in taps requiring flat response (thus no adjustment).

As illustrated in FIG. 8B, due to the use of an ideal taps based design, the need for compensating at the nodes (or amplifiers), and for the need to use various equalization modules or plug-ins in the cable setup 850 is eliminated. Instead, because the characteristics of the ideal taps used in cable setup 850, each tap can be identical regardless of its position in the cable network, and yet the outputs across the whole setup are uniform resulting in the same inputs to the CMs from each tap.

Figure 9A:
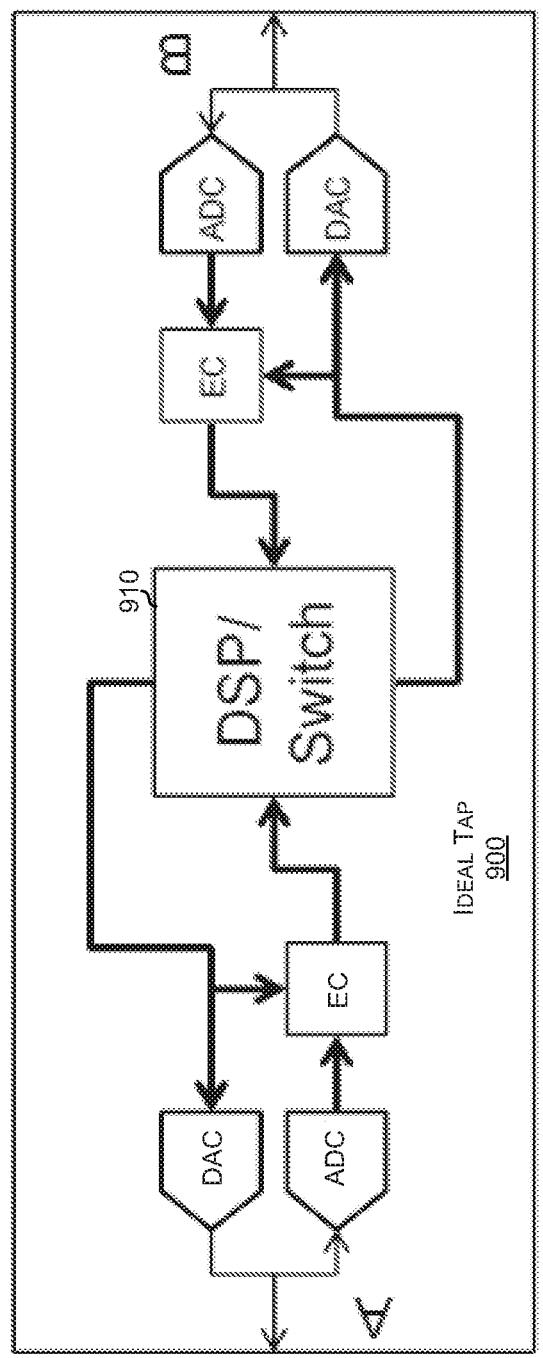
FIGS. 9A-9J illustrate various example use scenarios of ideal taps when configured for operation as 2-port digital repeaters.

FIGS. 9A-9J illustrate various example use scenarios of ideal taps when configured for operation as 2-port digital repeaters. Shown in FIG. 9A is an ideal tap 900, in accordance with the present disclose.

In this regard, the ideal tap 900 may be substantially similar to the ideal tap 500 described with respect to FIG. 5 for example. As illustrated in FIG. 9A, the ideal tap 900 may be configured for operation as 2-port digital repeater. In this regard, two ports, A and B, may be assigned for use of the functions associated with use of the ideal tap 900 as 2-port repeater. Input to each of the two ports may be digitized (e.g., via the corresponding ADC circuit), and output of each port may synthesized. Further, each port may be configured to cancel its own echo—e.g., using the corresponding EC circuit associated therewith. The ideal tap 900 may be operable to process signals handled when the ideal tap 900 is operating as 2-port repeater.

For example, the ideal tap 900 may comprise a digital signal processor (DSP) 910, which may be substantially similar to DSP/Switch 540 described with respect to FIG. 5, which may be used in processing signals handled in the ideal tap 900 during operations as 2-port repeater. For example, the DSP 910 may interpret the signal from each port, such as by performing such functions as demodulating, decoding (e.g., forward error correction (FEC) based decoding), etc.

The DSP 910 may also generate a new signal to each port, such as by applying function as re-coding, re-modulating, etc. The DSP 910 may repeat the signal received from one port to the other port. Further, the DSP 910 may mutate the signal received from each port before sending it to the other port, such as by applying such adjustments as level shifting, frequency shifting, equalization, phase shifting, etc. However, the raw digital DAC and ADC inputs and outputs are not available outside of the device.

Figure 9B:
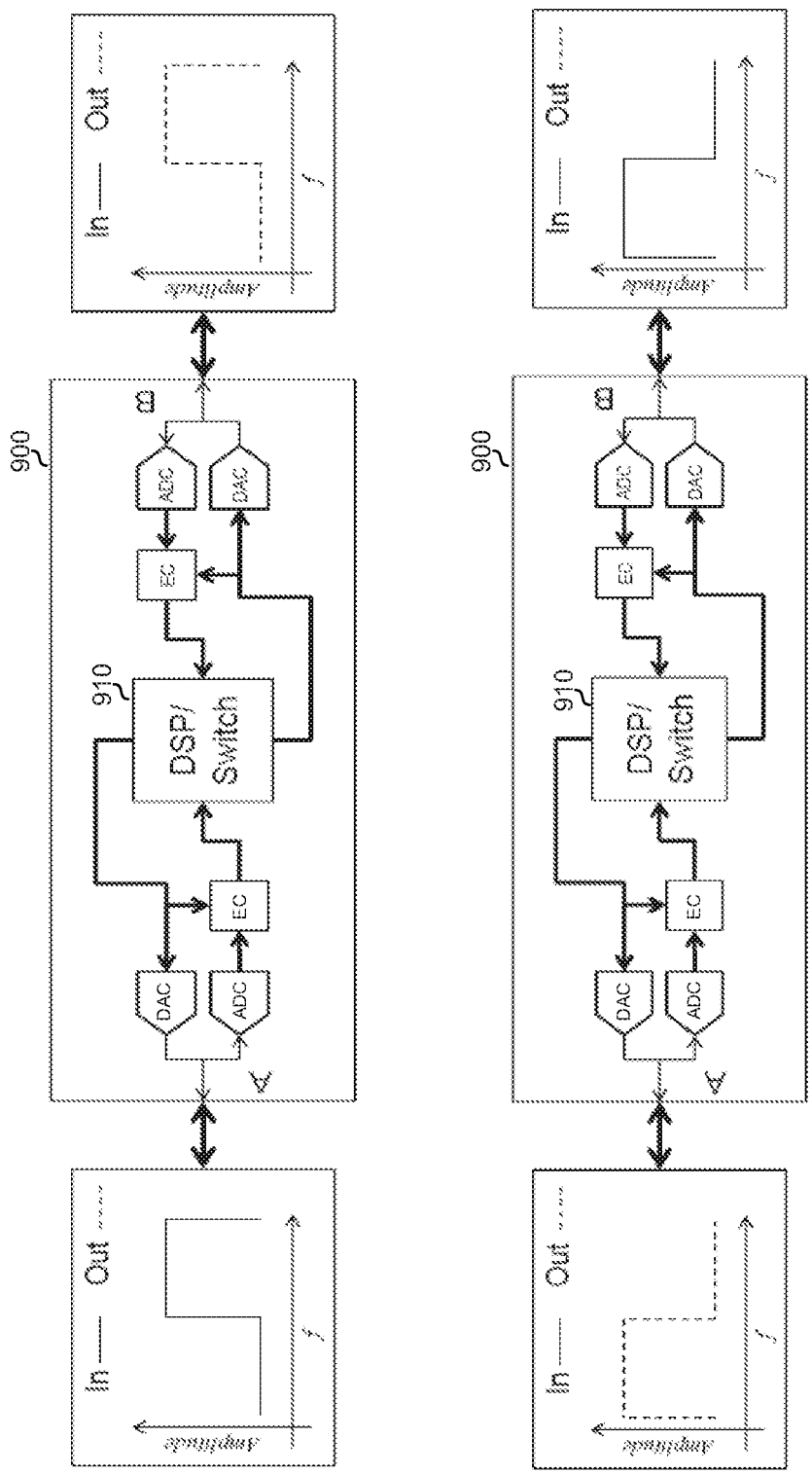

FIG. 9B illustrates an example use scenario of the ideal tap 900 when providing basic repeating functions—e.g., repeating signals without changes. In this regard, signals received at port A are sent, as received (without any changes thereto), to port B for outputting therefrom (911); and similarly, signals received at port B are sent, as received (without any changes thereto), to port A for outputting therefrom (913).

Figure 9C:
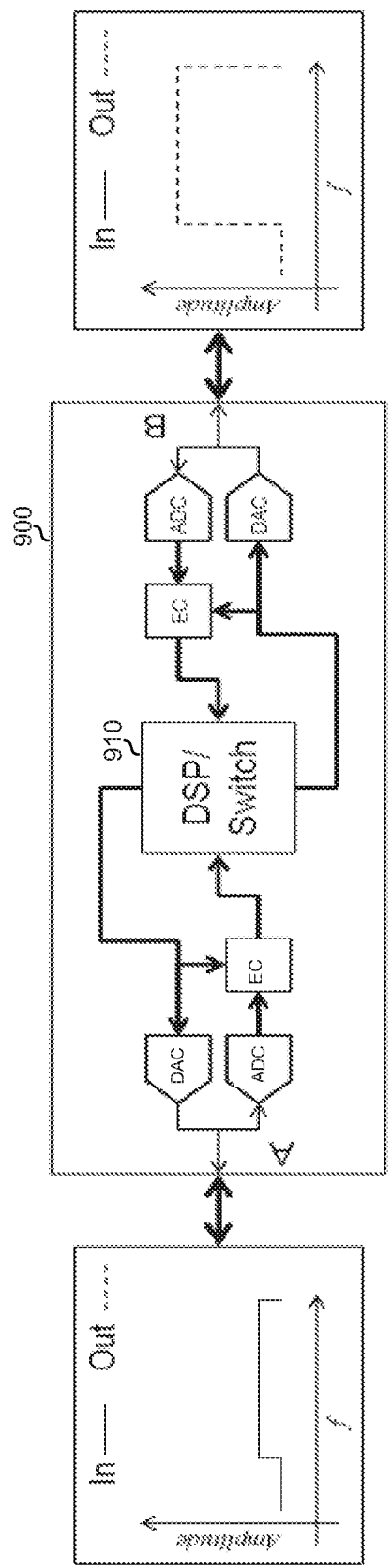

FIG. 9C illustrates an example use scenario of the ideal tap 900 when operating as 2-port repeater with power amplification—e.g., amplifying power of repeated signals. As shown in the particular use scenario illustrated in FIG. 9C, signals received at port A are sent to port B, for outputting therefrom, with increased power. The amplification may be adaptively controlled (e.g., amount of amplification applied, when to apply it or disable it, etc.), via the DSP 910 for example, such as based on particular and/or criteria (including, e.g., preset values, real-time measurements, etc.).

Figure 9D:
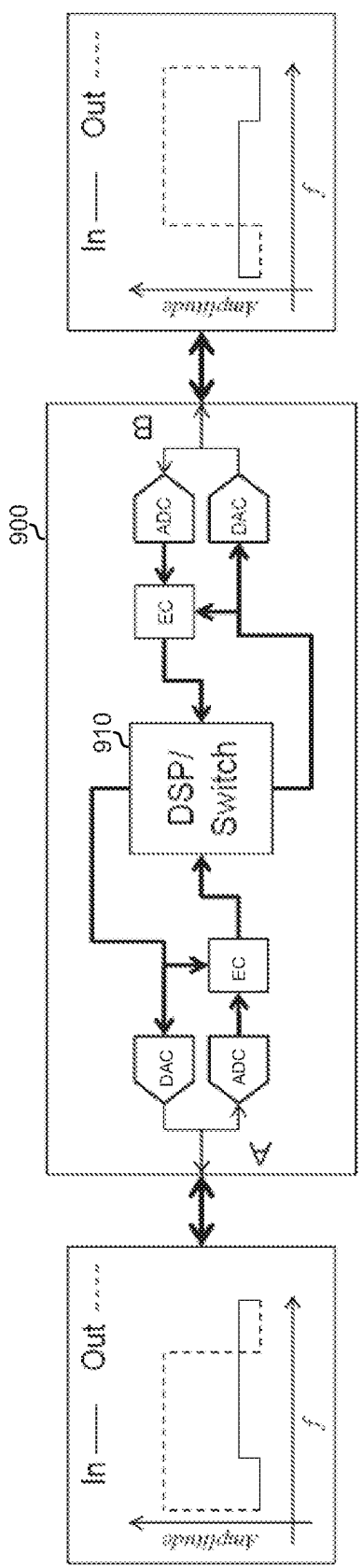

FIG. 9D illustrates an example use scenario of the ideal tap 900 when operating as 2-port amplifying full-duplex repeater—e.g., amplifying power of repeated signals concurrently and in both directions. As shown in the particular use scenario illustrated in FIG. 9D, signals received at port A are sent to port B, for outputting therefrom, with increased power, and concurrently signals received at port B are outputted from port A with increased power. This repeating with amplification may be done concurrently (in both directions: from port A to port B and from port B to port A), and repeated signals from port A to port B and from port B to port A may overlap in frequency. The amplification may be adaptively controlled (e.g., amount of amplification applied, when to apply it or disable it, etc.), via the DSP 910 for example, such as based on particular and/or criteria (including, e.g., preset values, real-time measurements, etc.).

Figure 9E:
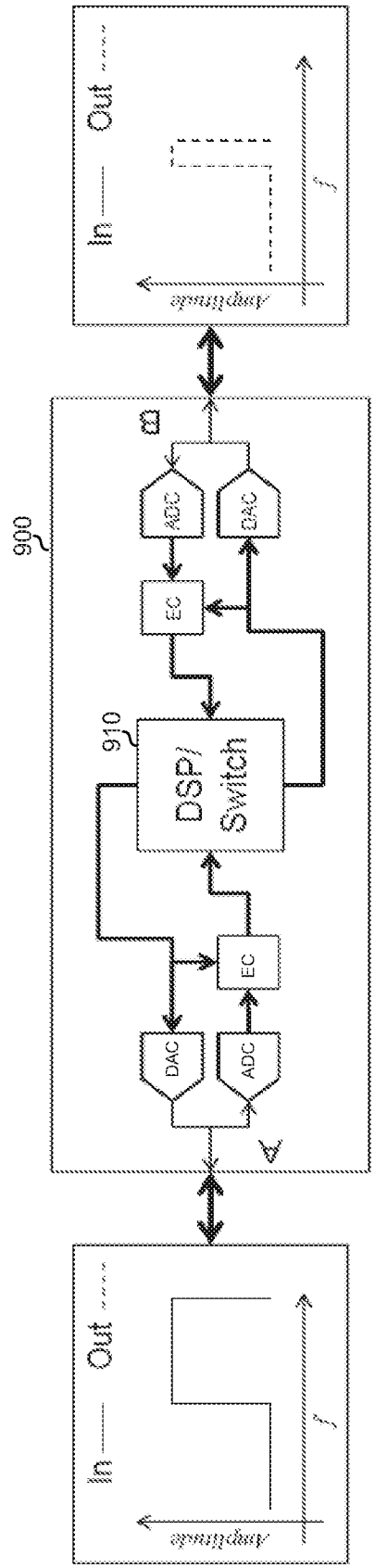

FIG. 9E illustrates an example use scenario of the ideal tap 900 when operating as 2-port repeater with filtering—e.g., applying filtering to repeated signals. As shown in the particular use scenario illustrated in FIG. 9E, signals received at port A are sent to port B, for outputting therefrom, but with a portion of the signals filtered out (thus not 'seen' out of port B). Further, as with other use scenarios, repeating with filtering may be adaptively controlled (e.g., amount of filtering applied, when to apply it or disable it, etc.), via the DSP 910 for example, such as based on one or more particular values and/or criteria (including, e.g., preset values, real-time measurements, etc.).

Figure 9F:
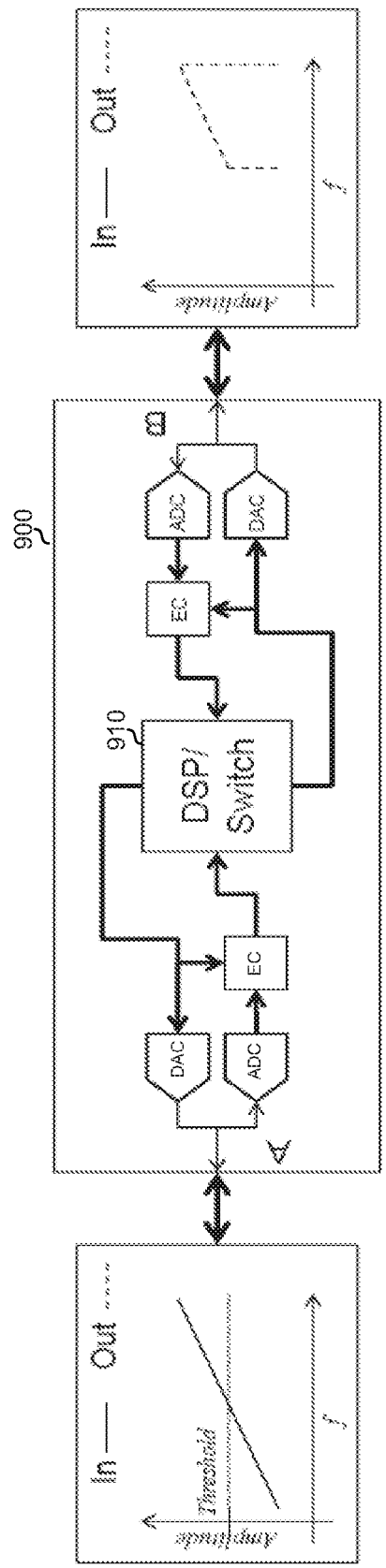

FIG. 9F illustrates an example use scenario of the ideal tap 900 when operating as 2-port repeater with threshold—e.g., utilizing thresholds to control repeating signals or portions thereof. As shown in the particular use scenario illustrated in FIG. 9F, signals received at port A are sent to port B, for outputting therefrom, with the repeating of these signals controlled based on a particular threshold—e.g., based on the signals' power spectral density (PSD). Thus, only signal portions greater than the threshold are sent out, with signals portions below the threshold filtered out (not 'seen' out of port B). In this regard, portions of the input signal from port A that are below the threshold are not sent to port B.

Repeating with thresholds may be useful and utilized in certain situations, such as if it is known that "good" signals will be above a certain threshold. Thus, when the threshold (s) is/are set correctly, the non-good signal portions are not repeated. Doing so may improve performance, as it prevents transmission of signals (portions) unnecessarily, and may also reduce propagation of noise. This may be time varying. As with other use scenarios, repeating with thresholds may be adaptively controlled (e.g., the threshold values, when to apply it or disable it, etc.), via the DSP 910 for example, such as based on one or more particular values and/or criteria (including, e.g., preset values, real-time measurements, etc.).

Figure 9G:
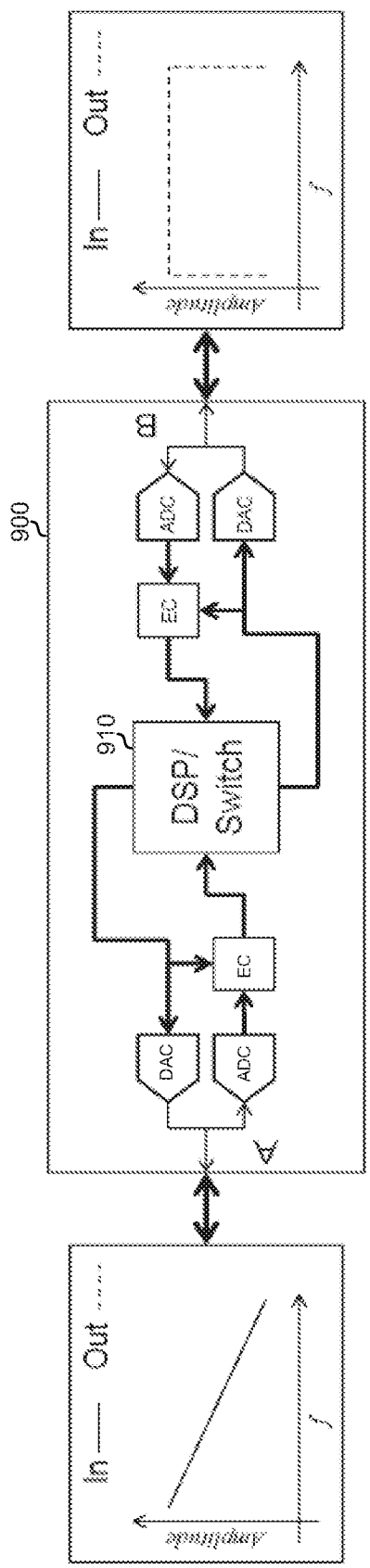

FIG. 9G illustrates an example use scenario of the ideal tap 900 when operating as 2-port repeater with equalization—e.g., applying equalization to repeated signals. As shown in the particular use scenario illustrated in FIG. 9G, signals received at port A are equalized then sent to port B, for outputting therefrom. Repeating with equalization may be utilized in certain situations, such as to counter frequency dependent loss of coaxial cables. As with other use scenarios, repeating with equalization may be adaptively controlled (e.g., amount of equalization applied, when to apply it or disable it, etc.), via the DSP 910 for example, such as based on one or more particular values and/or criteria (including, e.g., preset values, real-time measurements, etc.).

Figure 9H:
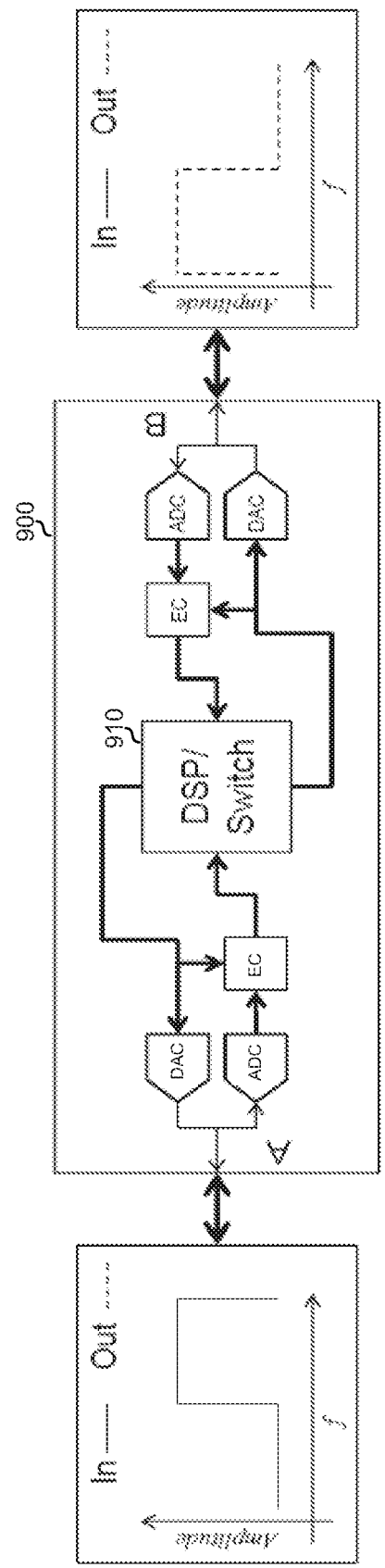

FIG. 9H illustrates an example use scenario of the ideal tap 900 when operating as 2-port repeater with frequency shift—e.g., applying frequency shift to repeated signals. As shown in the particular use scenario illustrated in FIG. 9H, signals received at port A are shifted in frequency then sent to port B, for outputting therefrom. As noted above, repeating with frequency shift may be utilized in certain situations, such as for frequency stacking/un-stacking. As with other use scenarios, repeating with frequency shift may be adaptively controlled (e.g., amount of frequency shift applied, when to apply it or disable it, etc.), via the DSP 910 for example, such as based on particular and/or criteria (including, e.g., preset values, real-time measurements, etc.).

Figure 9I:
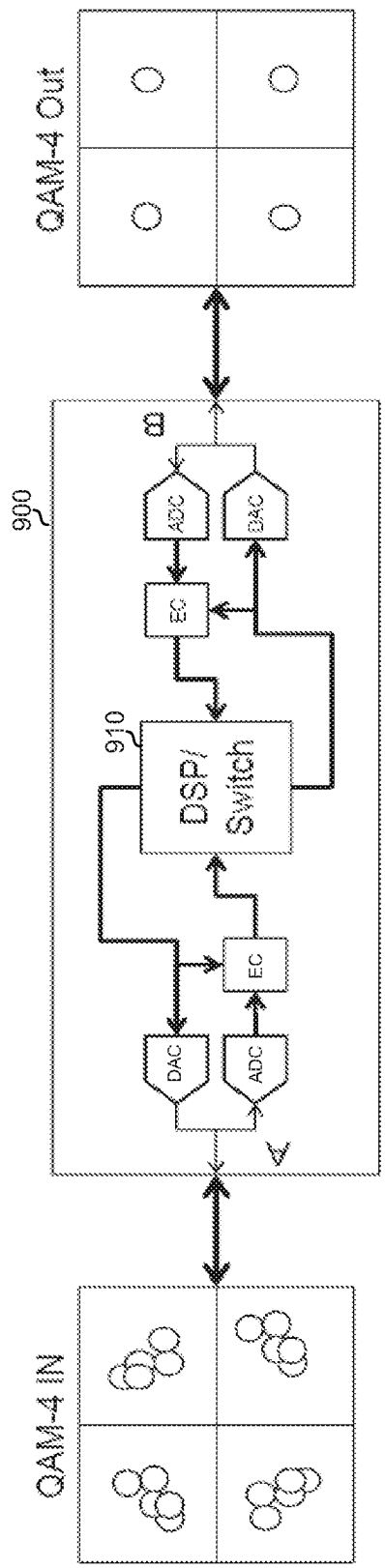

FIG. 9I illustrates an example use scenario of the ideal tap 900 when operating as 2-port repeater with error removal—e.g., applying error removal to repeated signals. In this regard, errors introduced during propagation may be addressed based on knowledge of, e.g., the modulation used for the signals. For example, with quadrature amplitude modulation (QAM) based signals the ideal tap has some knowledge as to what the desired signal looks like. Nonetheless, the disclosure is not so limited, and may be applied similarly to other modulation schemes.

In the particular use scenario illustrated in FIG. 9I, QAM-4 is shown for ease of demonstration. The received signals may exhibit drift (as shown in chart 921). Thus, the ideal tap 900 may be operable to re-modulate QAM signals to remove drift from the desired signal. Further, in some instances, further improvements may be achieved by applying additional correction measures, such as FEC correction (as describe below with respect to FIG. 9J).

For example, in the particular use scenario illustrated in FIG. 9I, signals received at port A may have errors in modulation. Thus, the ideal tap 900 may (e.g., via the DSP 910) may demodulate the received signals to determine the errors, and after removing the drifting errors, may re-modulate the signals before being sent to port B for outputting therefrom. Hence, the outputted signals may exhibit less drift errors (as shown in chart 923). Accordingly, noise does not propagate, and the noise figure may be negative.

As with other use scenarios, repeating with error removal may be adaptively controlled (e.g., the error removal applied, when to apply it or disable it, etc.), via the DSP 910 for example, such as based on particular and/or criteria (including, e.g., preset values, real-time measurements, etc.).

Figure 9J:
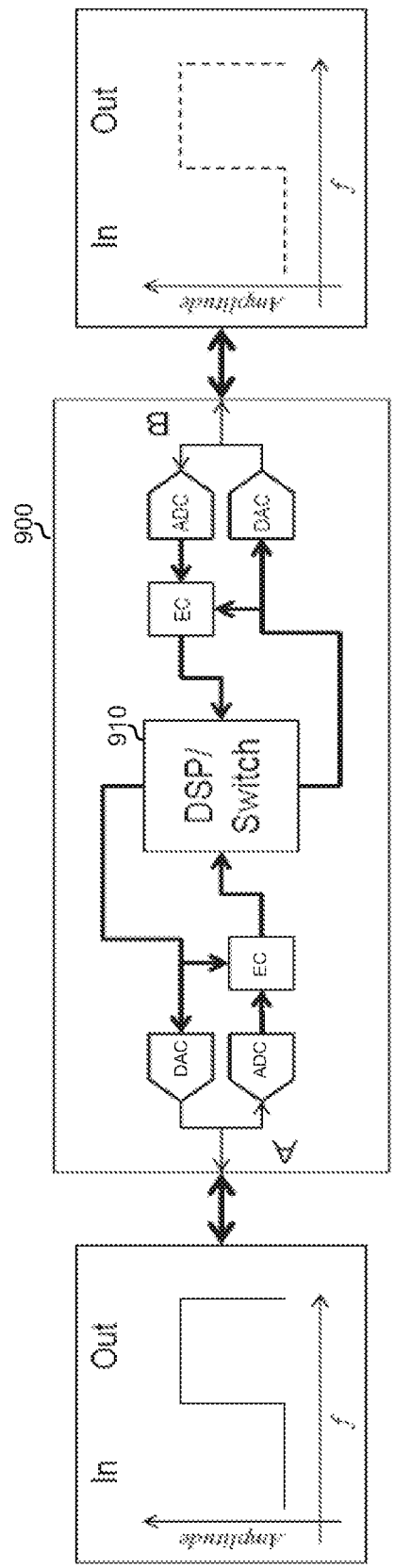

FIG. 9J illustrates an example use scenario of the ideal tap 900 when operating as 2-port repeater with forward error correction (FEC) correction—e.g., applying FEC correction to repeated signals.

In this regard, as noted above, in some instances ideal taps may be configured to incorporate use of error detection and correction measures to improve performance. This includes use of modulation error removal as described above. Performance may be further improved by use of additional correction measures, such as FEC correction. In this regard, FEC correction may be used to correct bit errors. Supporting FEC correction in this manner may require more complexity in the taps (e.g., knowledge about the signals traversing it) and may add latency. Nonetheless, the use of such correction measures would further "clean" the signal In the particular use scenario illustrated in FIG. 9J, signals received at port A may have errors in modulation. These errors may be larger than what can be corrected via re-modulation alone (as described above with respect to FIG. 9I). Thus, the ideal tap 900 may (e.g., via the DSP 910) demodulate and then decode the received signal. In this regard, modulation errors can be detected and some corrected via FEC related functions. The ideal tap 900 may then re-code the bit stream, and then re-modulate it onto the signals sent to port B, for outputting therefrom.

The use of repeating with correction (e.g., FEC correction) may allow for removing noise from the desired signals, further improving the noise figure in the network. Accordingly, the net effect of using these measures—e.g., error removal and FEC correction, allows for improved overall tap utilization—e.g., allowing for cascading many ideal taps without loss of signal or an onerous buildup of noise. This along with increased spectrum obtained by other means (e.g., use of frequency shifting) may increase (rather than decrease) the HHP per segment.

As with other use scenarios, repeating with FEC correction may be adaptively controlled (e.g., the FEC correction applied, when to apply it or disable it, etc.), via the DSP 910 for example, such as based on particular and/or criteria (including, e.g., preset values, real-time measurements, etc.).

Figure 10A:
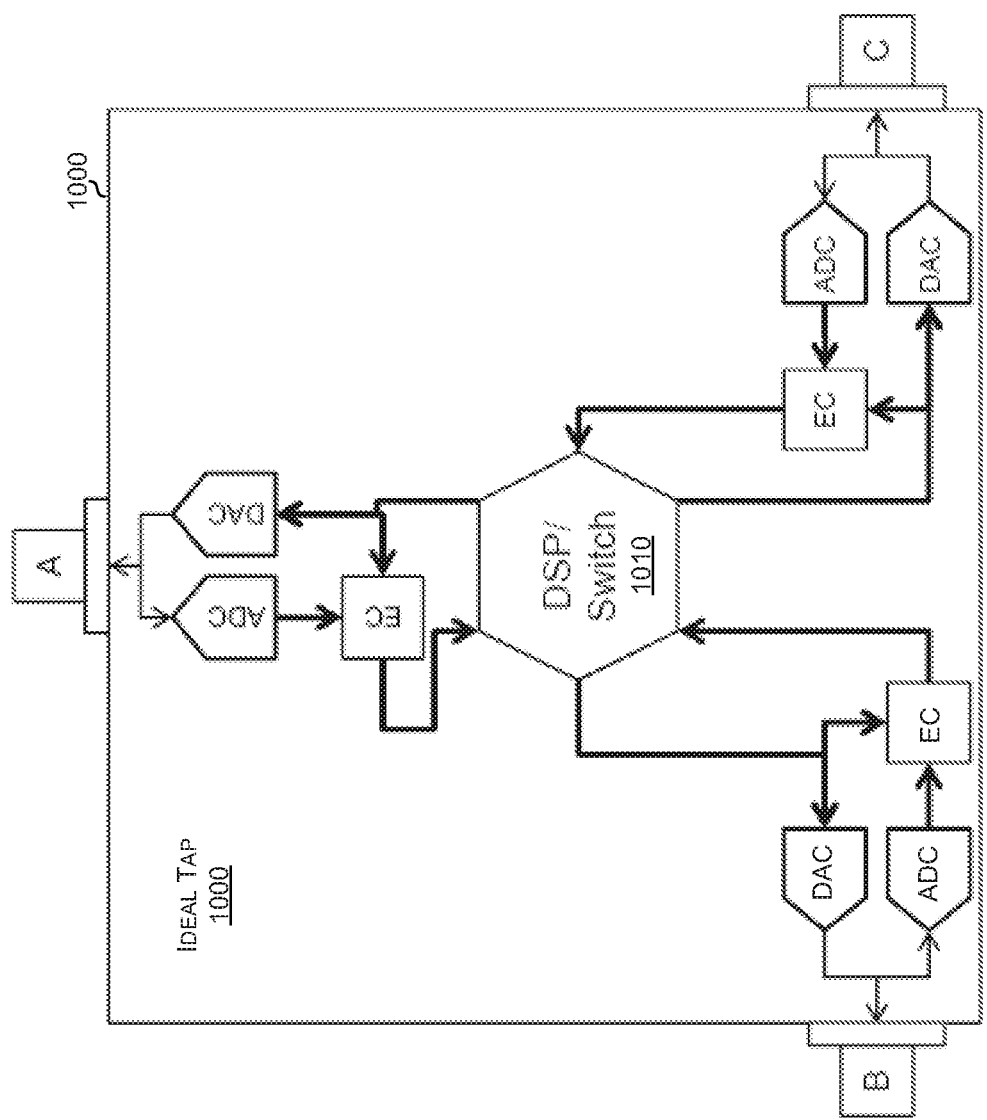
FIGS. 10A-10C illustrate various example use scenarios of ideal taps when configured for operation as 3-port digital repeaters.
Figure 10B:
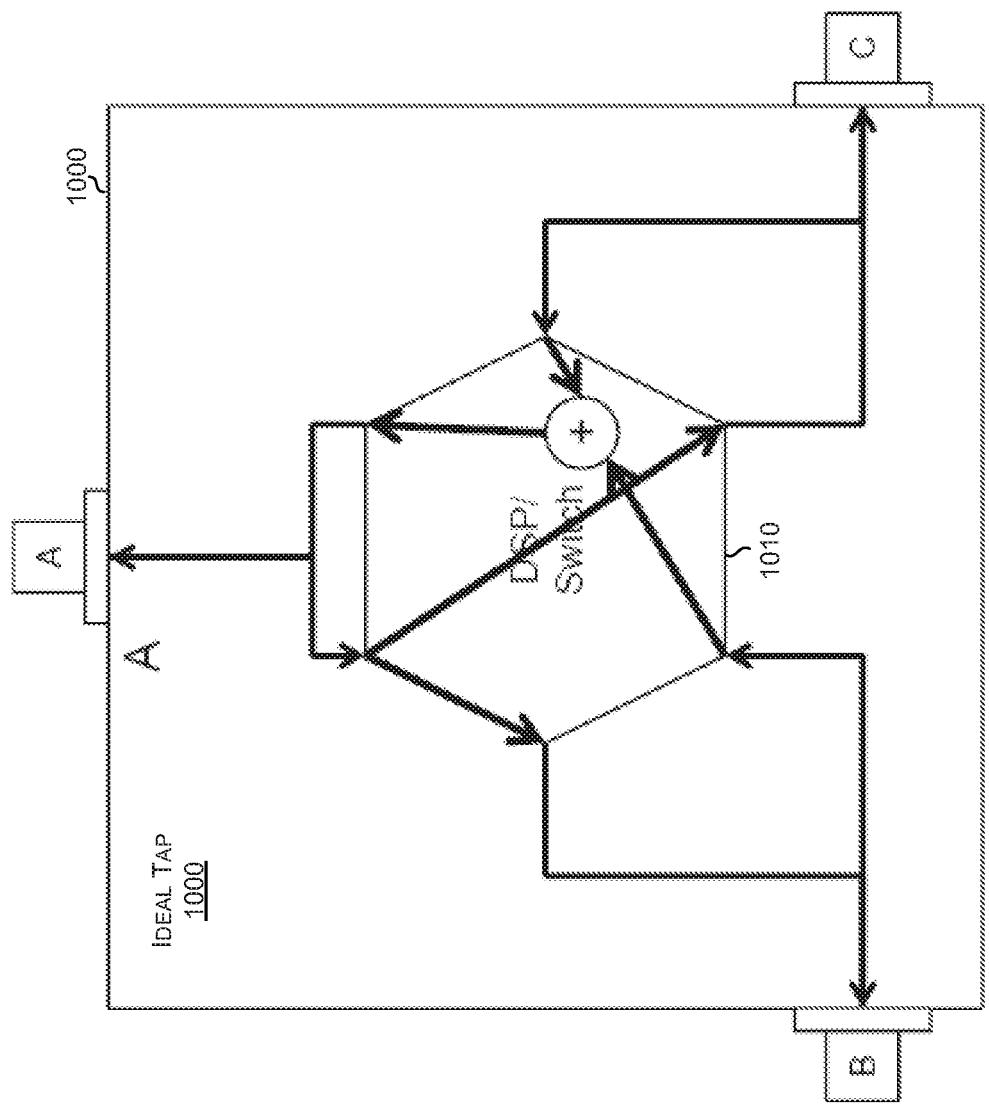
Figure 10C:
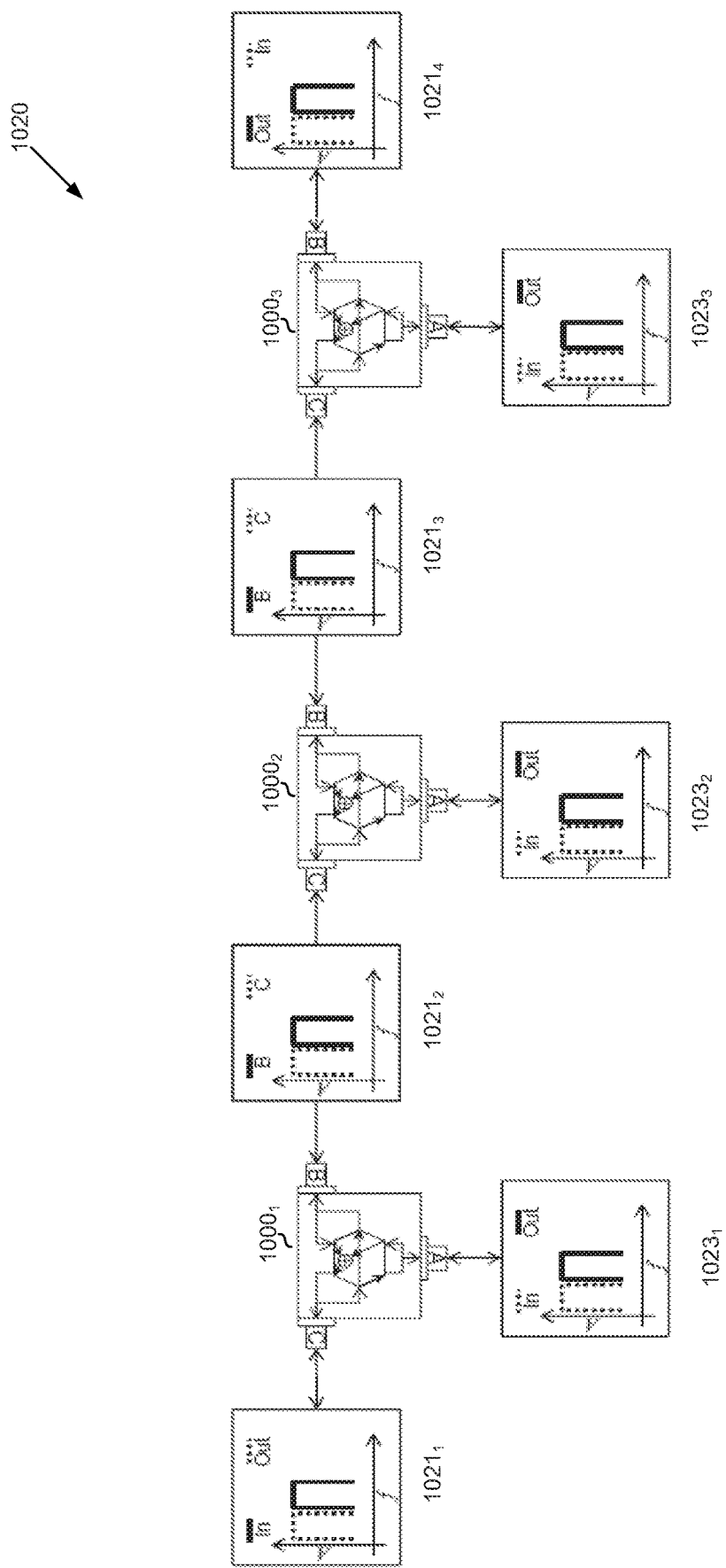

FIGS. 10A-10C illustrate various example use scenarios of ideal taps when configured for operation as 3-port digital repeaters. Shown in FIG. 10A is an ideal tap 1000, in accordance with the present disclose.

In this regard, the ideal tap 1000 may be substantially similar to the ideal tap 500 described with respect to FIG. 5 for example. As illustrated in FIG. 10A, the ideal tap 1000 may be configured for operation as 3-port digital repeater. In this regard, three ports, A, B, and C may be assigned for use in the functions associated with use of the ideal tap 1000 as 3-port repeater. In this regard, as with the 2-port repeater configuration, input to each of the three ports may be digitized (e.g., via the corresponding ADC circuit), output of each of the three ports may be synthesized, and each port may be configured to cancel its own echo—e.g., using the corresponding EC circuit associated therewith. Further, the ideal tap 1000 may be operable to process signals handled when the ideal tap 1000 is operating as 3-port repeater. In this regard, the ideal tap 1000 may comprise a digital signal processor (DSP) 1010, which may be substantially similar to DSP/switch 560 described with respect to FIG. 5, which may be used in processing signals handled in the ideal tap 1000 during operations as 3-port repeater.

In operation, the ideal tap 1000 when configured as a 3-port repeater may be operable to perform all the functions associated with the 2-port repeater configuration—e.g., as described above with respect to FIG. 9A-9J. However, the 3-port repeater configuration may allow for additional functions. For example, the 3-port repeater configuration may allow for replication with 0 loss or gain—that is, the ability to send signals from the input of one port to both of the other ports at the same level or greater than the level at which the signals were received. Further, the 3-port repeater configuration may allow for summing of the inputs from multiple ports and outputting of that sum to one or more ports. These added features, and others, are described in more detail below.

FIG. 10B illustrates an example use scenario of the ideal tap 1000 when configured as 3-port repeater. In this regard, as noted above, the 3-port repeater configuration may allow for sending signals from the input of one port (referred to as "common port") to both of the other ports, and/or for outputting the sum of inputs from multiple ports from such common port. In the example use shown in FIG. 10B, port A may be assigned as common ports. Thus, input of (signals received at) port A are sent to both of port B and port C for outputting therefrom. On the other hand, inputs of both of port B and port C are summed and sent to port A for outputting therefrom.

Thus, during operation, high isolation is provided between port B and port C—e.g., input at port C not sent to port B and input at port B not sent to port C. Such arrangement may result in various improvements. For example, no 3 dB splitting or combining loss may occur. Further, gain may be applied, adaptively in various paths—e.g., port A→port B, port A→port C, and port B+port C→port A. While port A is the common port in the example use scenario shown in FIG. 10B, this is not always required. Thus, any one of the three ports (port A, port B, and port C) may be assigned as the common port, and this assignment need not be fixed (e.g., the common port can be different in time), and the common port may be different in frequency, Further, there may be isolation between the non-common ports can vary vs. frequency and time.

In some instances, particular transmission and/or reception criteria may be assigned to one or more of the ports—e.g., MoCA signals may be passed between port B and port C, but are not sent to port A.

FIG. 10C illustrates an example use scenario of a cascade of ideal taps configured as 3-port repeater, for use as a 1-port RF tap. In this regard, in the example use shown in FIG. 10C, three ideal taps 1000₁-1000₃ (each an instance of the ideal tap 1000) are each configured as 3-port repeater, and with one of the 3 port in each of these taps (port C as shown in FIG. 10C) being assigned as the tap in-port, with one of the 3 ports in each of these taps (port B as shown in FIB. 10C) being assigned as the tap out-port, and the last of the 3 ports in each of these taps (port A as shown in FIG. 10C) being assigned as the tap drop-port. The three taps are then cascaded in the manner shown in FIG. 10C, whereby each of subsequent taps connects to the previous taps out-port via its in-port. This arrangement allows for separation between the inputs and outputs at each port as shown in FIG. 10C (charts $1021_1\text{-}1021_4$ and $1023_1\text{-}1023_3$).

While FIG. 10C shows all taps as 3-port repeaters used as 1-port taps, each of the taps shown could be comprised of N-port taps, such as the embodiment shown in FIGS. 5 and 6. The number of ports for each tap would vary according to the design guidelines used to implement the system. Just as existing RF taps come in multiple port configurations today, it is expected that a number of variations will be available of the N-port tap where N varies.

In various implementations in accordance with the present disclosure, a distributed low gain amplification methodology may be used to optimize the design and implementation of cable networks.

In this regard, signal level from nodes to CPEs no longer drives plant design. Rather, only a single length of trunk or coax cable needs to be considered. Target input to each tap may be 0 dBmV. Output, functionality, and configuration of each tap may be controlled, e.g., within the ideal tap (e.g., CPU in the ASIC of the tap) automatically via echo training and/or controlled remotely via a cloud based controller. The plant designer may need to ensure that the max cable length is not exceeded. In this regard, max cable length may be determined by the dynamic range of the ideal tap receivers and the targeted SNR of the system. The plant designer may further need to configure taps to, e.g., enable or disable ports for both US and DS direction, enable portions of the spectrum to repeat, enable threshold PSD controlled repeating or continuous repeating, enable or disable frequency shifting on all or some of the spectrum, configure which ports should be summed together to the in port, etc. The number of ideal taps in cascade may only be limited by spectrum consumption. In this regard, tap cascades may be very long—e.g., hundreds of taps arranged in cascaded manner may be possible if demand is low enough or spectrum is high enough. The CPE may operate at a lower frequency than the pass band of the ideal tap. Further, several "channels" may be stacked on the trunk line, and then a specific channel for a specific CPE is down-converted on the port to which the specific CPE is attached.

As noted above, ideal taps provide solutions to the problems with traditional HFC design. Less RF expertise may be required to design with ideal taps. The need for particular equalization modules and/or profiles at different taps (e.g., CSs and CEs) may be eliminated. Rather, dynamic port-by-port equalization may be performed. Ideal taps have high isolation. In this regard, neighboring CPE cannot 'hear' each other. TDD systems or other in-home systems, such as MoCA networks and related transceivers, may work within the ideal taps. Further, FDX operations at the CPE may be possible. Ideal taps have high return loss. In this regard, noise from micro-reflections may be reduced, and as such FDX may be simplified. Ideal Taps may be active components. Thus, taps may be monitored remotely; may change configuration remotely (e.g., port enable/disable); may block ingress noise; may notch out undesired spectrum, etc. Ideal taps may also measure RF metrics of each port including "full-spectrum" capture and report these metrics to a remote computer or controller.

Despite the improved performance offered by the ideal tap, total power consumption and HHP may be low. In this regard, high gain amps are removed (e.g., 38 dBmV output form the node, 38 dBmV TCP at the CPE, etc.). CPEs may consume less power, even with FDX. All CPEs transmit at lower power, even those far from the node or AMP. Further, nodes consume less power (e.g., 80% less) per HHP. MER performance is High (e.g., MERs in the mid-50s and 32K and 64K QAM may be possible). The use of ideal taps may result in higher HHP per segment, as cable design is no longer RF signal limited. Frequency allocation for US and DS directions may be flexible in designs based on ideal taps and dynamically allocated. This may allow for elimination of diplexers. Further, spectrum allocation is unique for each tap port. Thus, every CPE may get the split between US and DS that provides its best performance.

Figure 11:
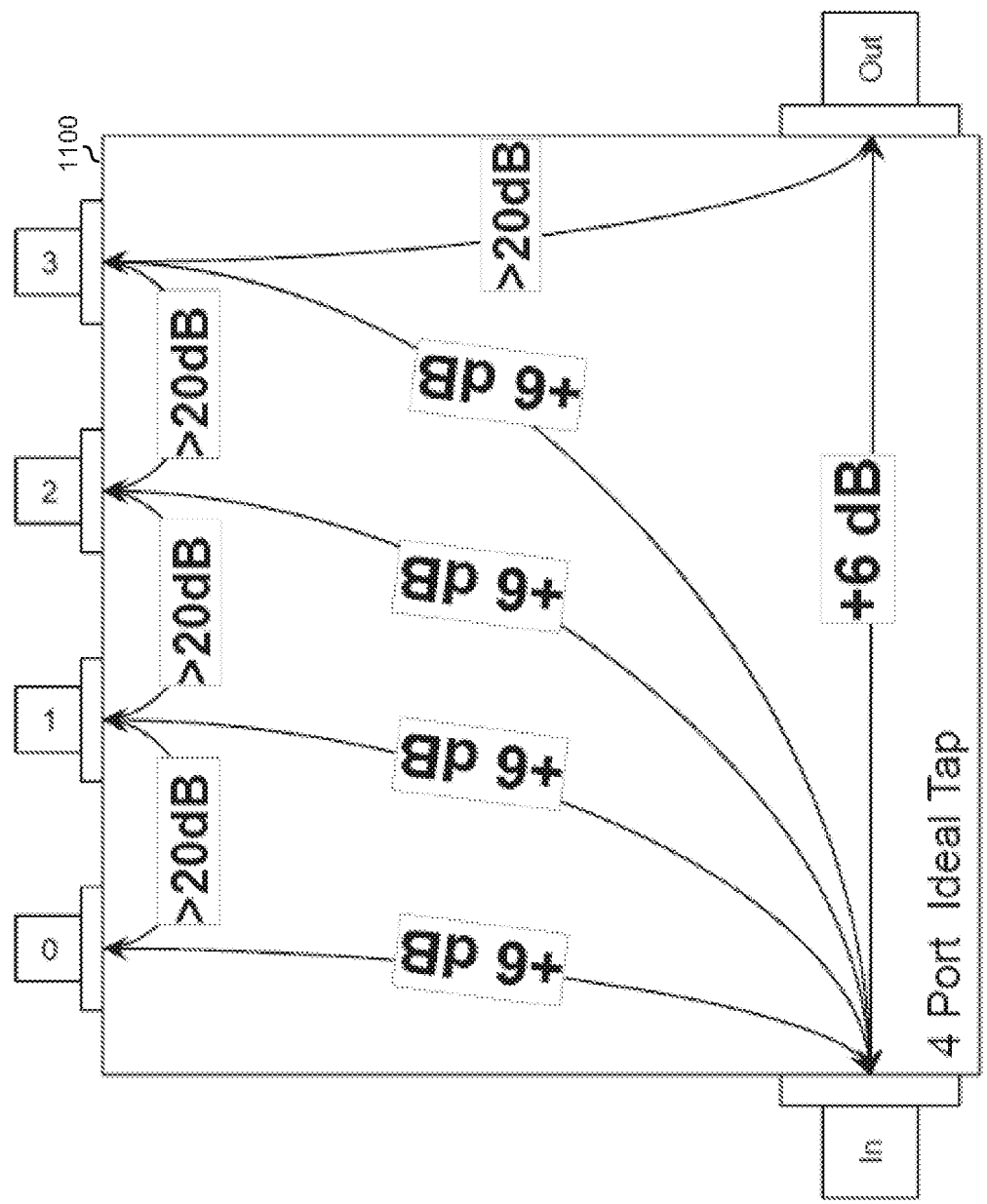
FIG. 11 illustrates a performance profile of an example N-port ideal tap in accordance with an example embodiment of the present disclosure.

FIG. 11 illustrates a performance profile of an example N-port ideal tap in accordance with an example embodiment of the present disclosure. Shown in FIG. 11 is an N-port (e.g., 4 ports, as shown in FIG. 11) ideal tap 1100.

The ideal tap 1100 may comprise suitable circuitry for providing tap-related functions in cable networks, such as, for example, allowing coupling of CPEs to coax cable networks (particularly to the trunk coax portions). As shown in FIG. 11, the ideal tap 1100 is a 4-port tap—that is, one with 6 ports: an "in" port (or "in-port"), an "out" port (or "out-port"), and 4 "drop" ports (or "drop-ports"). In this regard, the drop-ports are used for coupling CPEs into the coax network. Nonetheless, it should be understood that the disclosure is not limited to the use of 4 drop-ports, and that different number of drop-ports can be used in different implementations. Similarly, it should be understood that the disclosure is not limited to a single in-port and/or single out-port based implementations, and as such some implementations may incorporate use of multiple in-ports and/or multiple out-ports, which may enable connecting different legs of the coaxial plant.

In particular, the ideal tap 1100 may be designed and configured as an "ideal" tap—that is, one having characteristics that provide ideal performance, and thus overcoming at least some of the limitations and/or issues noted above with respect to traditional coax design. Thus, the ideal tap 1100 may be substantially similar to the ideal tap 400 of FIG. 4, and as such may operate in a substantially similar manner. The ideal tap 1100 may be implemented in accordance with a design that is based on characteristics that allow overcoming inherent losses in a cable network, without requiring use of amplifiers and/or diplexers in the networks, as is done in legacy solutions.

For example, in accordance with this example embodiment, the ideal tap may be configured such that it has flat band pass up to 1.2 GHz, at ~55 dB MER (resulting, e.g., in total composite power of ~+50 dBmV), with isolation of >20 dB between drop-ports and/or between the drop tap and the out-port, and with return loss of >20 dB for the in-port, out-port, and drop-ports. In addition, the ideal tap in accordance with this example embodiment may have an in-to-drop (e.g., from the in-port to any of the 4 drop-ports, and vice versa) 6 dB gain and 4 dB up-tilt (e.g., 100 MHz-1 GHz), which may allow overcoming loss in an upstream trunk cable (e.g., 100 to 200 feet), but not drop cable (e.g., 50 to 150). The ideal tap in accordance with the alternate design may also have an out-to-in (e.g., from the out-port to the in-port, and vice versa) with a similar profile—that is, with 6 dB gain and 4 dB up-tilt (e.g., 100 MHz-1 GHz), which may allow overcoming loss in an upstream trunk cable (e.g., 100 to 200 feet). Further, the ideal tap in accordance with this example embodiment supports disabling/enabling ports remotely, and may be able to communicate information related to itself (e.g., status, metrics, etc.). An example implementation of an ideal tap based on this example embodiment is described with respect to FIG. 12.

Figure 12:
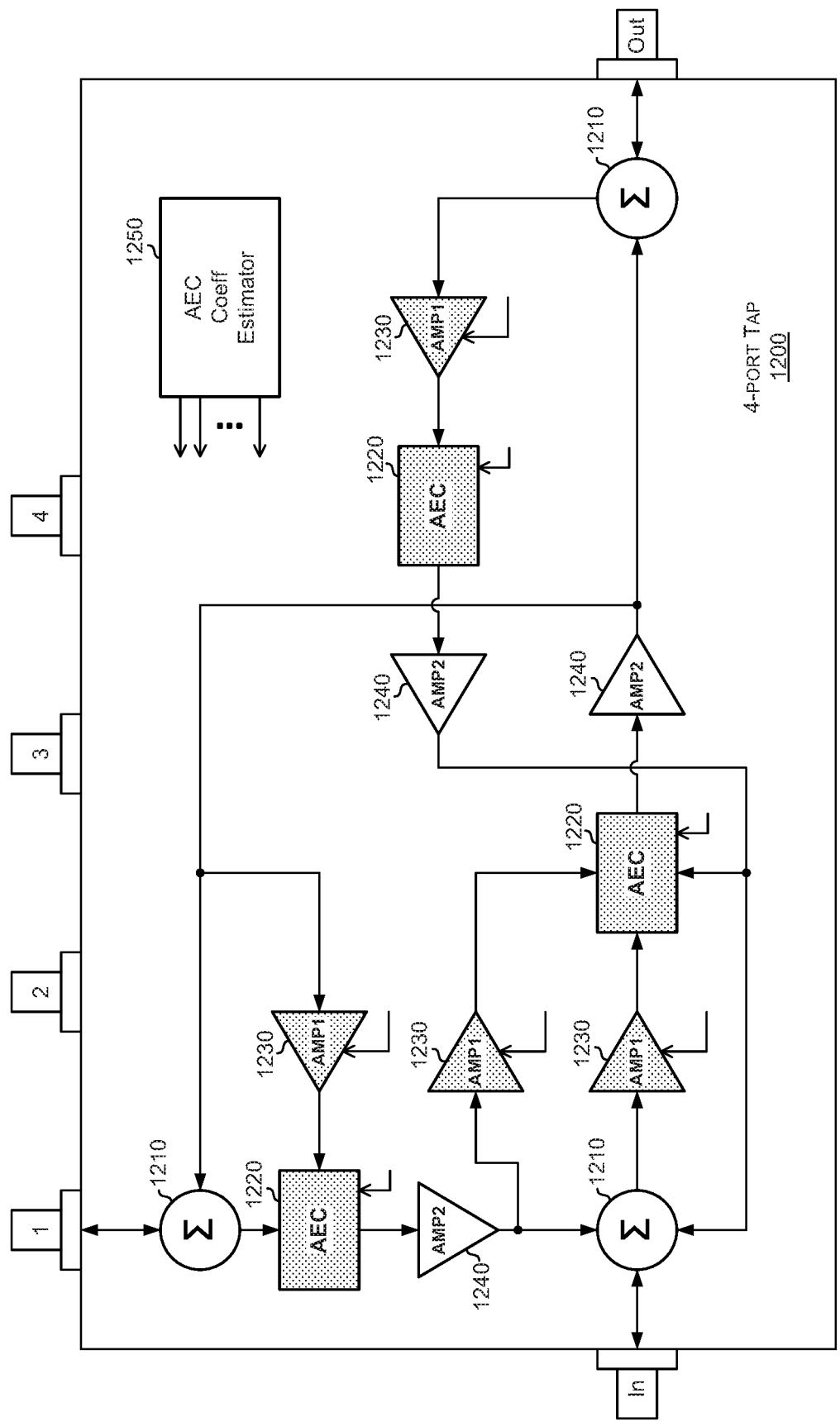
FIG. 12 illustrates an example implementation of an N-port ideal tap in accordance with the example embodiment shown in FIG. 11.

FIG. 12 illustrates an example implementation on an N-port ideal tap in accordance with the alternate design described in FIG. 11. Shown in FIG. 12 is an N-port (e.g., 4-port as shown in FIG. 12) ideal tap 1200.

The ideal tap 1200 may comprise suitable circuitry for providing tap-related functions in cable networks, and to particularly do so as an "ideal" tap in accordance with the example embodiment described above with respect to FIG. 11, for example. As with the ideal tap 1100, the ideal tap 1200 is also shown as a 4-port tap—that is, with an in-port, an out-port, and 4 drop-ports (numbered as port 1 through port 4).

The ideal tap 1200 may comprise various circuits for use in conjunction with reception and transmission of signals each of the ports, such as summation circuits 1210, analog echo cancelation (AEC) circuits 1220, amplifier/first type (AMP1) circuits 1230, and amplifier/second type (AMP2) circuits 1240, which may be arranged in the manner shown in FIG. 12. In this regard, shown in FIG. 12 are only (some of the) circuits used between the in-port, output-port, and the first drop-port (port-1) within the ideal tap 1200. Nonetheless, it should be understood that similar circuit layout(s) may be used for the remaining drop-ports). Further, the ideal tap 1200 comprises an AEC coefficient estimator 1250.

The AEC circuits 1220 are operable to cancel echo. In this regard, the AEC circuits 1220 may be arranged within the ideal tap 1200 to ensure cancelling echoes for each for the ports, as echoes do not propagate and thus echo only needs to be accommodated—e.g., for at most 250' of cable. Each of the AMP1 circuits 1230 and the AMP2 circuits 1240 may be operable to amplify signals. However, these amplifier circuits may have different amplification profiles. For example, each AMP1 circuit 1230 may be configured to provide 0 dB gain and ~50 dB reverse isolation, whereas each AMP2 circuit 1240 may be configured to provide ~6 dB gain, 4 dB tilt, and ~50 dB reverse isolation. Accordingly, as shown in FIG. 12, the ideal tap 1200 may exhibit the characteristics described above.

While not shown in FIG. 12, the ideal tap 1200 may comprise additional circuits, such as host/main processor(s), signal processing circuit(s), communication (e.g., Multimedia over Coax Alliance (MoCA)) controller(s), Cable Modem, etc. For example, the host/main processor(s) may comprise suitable circuitry for managing and controlling the tap 1200 and operations thereof; the signal processing circuit(s) may comprise suitable circuitry for performing signal processing functions (if needed) in the ideal tap 1200; and the communication controller(s) may comprise suitable circuitry for handling communication (e.g., in accordance with MoCA standards, such as using 1 channel, or in accordance with the DOCSIS standard) other than the US and DS cable signals being handled via the ideal tap 1200.

The AEC circuits 1220 and the AMP1 circuits 1230 may be controllable—e.g., having one or more operational parameters that are configurable and/or adjustable. In this regard, the AEC circuits 1220 and the AMP1 circuits 1230 may be controlled via the AEC coefficient estimator 1250, which may generate control signals that allow adjusting the AEC circuits 1220 and the AMP1 circuits 1230 (e.g., adjusting the coefficients used in echo cancellations, and/or the gain, etc., characteristics of the AMP1 circuits 1230).

In this regard, the AEC coefficient estimator may be used to enable echo cancellation training, which may be required as the tap does not generate US or DS signals, and thus may need to determine clean copies. For example, for the downstream (DS) echo cancellation coefficient estimation, US silent periods may be utilized when DS echo cancellation is trained (e.g., utilizing signaling of quiet period from CCAP (Converged Cable Access Platform) Core to the tap using out-of-band/narrowband (OOB/NB) channel(s)). Alternatively, DS pilot signals may be utilized, such as for continuous tracking of DS echo cancellation. The upstream echo (US) canceller coefficient estimation may be done after DS echo cancellation is fully trained, as this may ensure that DS signals are fully cancelled, thus ensuring that the residual signal(s) may be upstream only. In some instances, there may be coefficient convergence and stability criteria related considerations. In this regard, amplification in both US/DS directions may have potential for closed loop instability.

Figure 13:
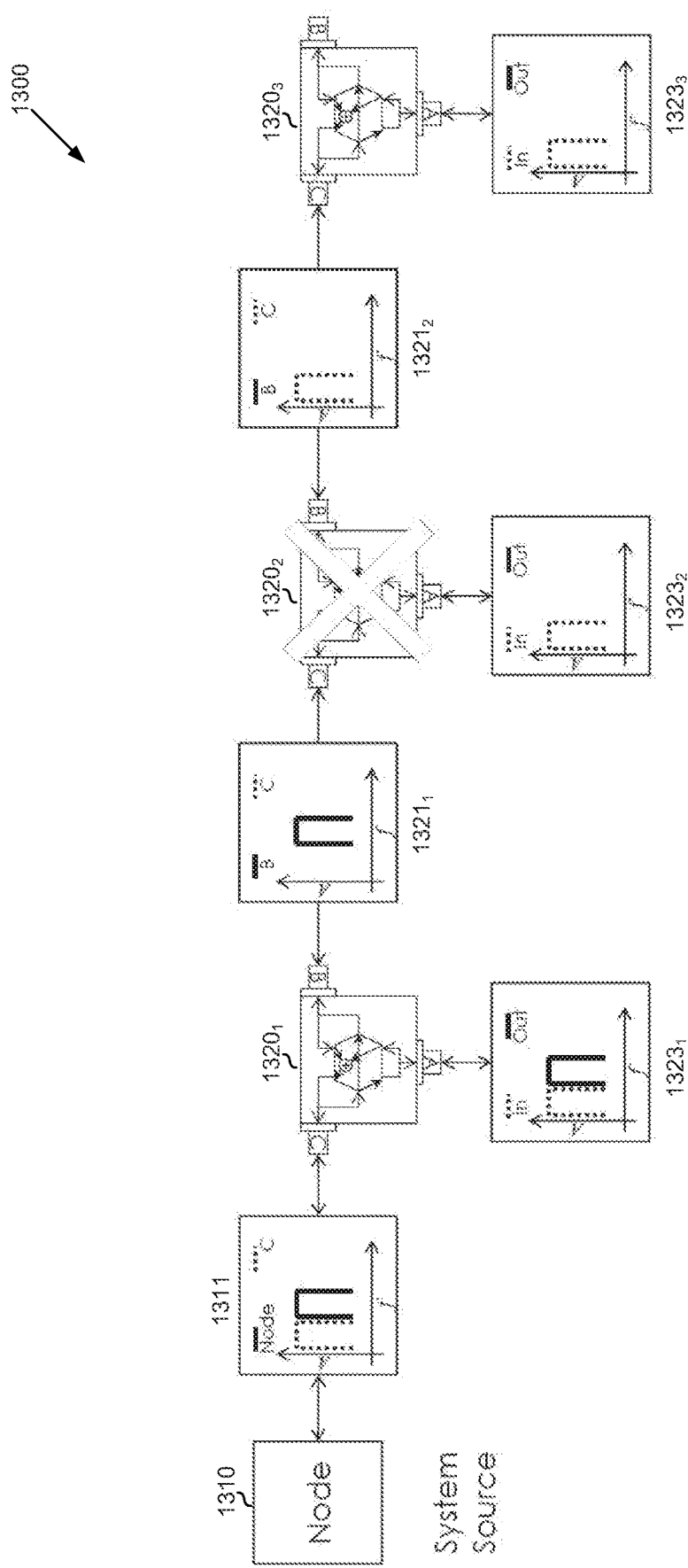
FIG. 13 illustrates an example cable network incorporating ideal taps, and an example use scenario therein in which a tap becomes unavailable.

FIG. 13 illustrates an example cable network incorporating ideal taps, and an example use scenario therein in which a tap becomes unavailable. Shown in FIG. 13 is cable network 1300 (or a portion thereof), which may be implemented as hybrid fiber-coaxial (HFC) based distribution network.

As shown in FIG. 13, the portion of the cable network 1300 comprises a network node 1310 and three ideal taps $1320_1$-$1320_3$. In this regard, each tap 1320 may comprise suitable circuitry for providing tap-related functions in cable networks, substantially as described above for example, with the network node 1310 sourcing signals to and sinking signals from end stations (e.g., CPEs; not shown) connected via the taps. In the particular example use scenario shown in FIG. 13, each of the ideal taps $1320_1$-$1320_3$ may be a 3-port tap, and may be configured substantially similar to the ideal tap 1000, as described with respect to FIGS. 10A-10C.

In each of the ideal taps $1320_1$-$1320_3$, one of the 3 ports (port C as shown in FIG. 13) may be assigned as the tap in-port, another one of the 3 ports (port B as shown in FIG. 13) may be assigned as the tap out-port, and the last of the 3 ports in each of these taps (port A as shown in FIG. 13) may be assigned as the tap drop-port.

The three taps may be cascaded in the manner shown in FIG. 13, with each tap being connected via its in-port to the out-port of the previous tap. Such arrangement may allow for separation between the inputs and outputs at each port as shown in FIG. 13, and as illustrated in frequency charts 1311, $1321_1$, $1321_2$, and $1323_1$-$1323_3$. Nonetheless, while FIG. 13 shows all taps as 3-port taps, it should be understood that this is merely for illustrative purposes and that the disclosure is not so limited, and as such the taps may be N-port taps with N being a value other than 3, such as in the embodiments shown in FIGS. 5 and 6. In this regard, the number of ports for each tap would vary according to the design guidelines used to implement the system. Just as existing RF taps come in multiple port configurations today, it is expected that a number of variations will be available of the N-port tap where N varies.

In some instances, networks incorporating ideal taps may experience performance issues (e.g., outages) due to failures at certain taps. In this regard, ideal taps may be more likely to suffer failures than traditional taps. This may be because traditional taps are passive elements, and thus failures may be less likely than in ideal taps, which are active elements. As noted, such failures may affect performance of the network, and the effects may be significant.

For example, in an ideal tap-based network, incorporating a number of taps connected in cascading fashion, failure of one tap (or one port on the tap) may affect all elements (including CPEs and other network nodes) downstream from that tap. For example, with reference to the cable network 1300 as shown in FIG. 13, if a failure occurs at the middle tap (i.e., tap $1320_2$ or tap 2) in the line, this prevents DS signals from propagating from the network node 1310 to stations connected to tap 2 and beyond. It also prevents US signals from stations on tap 2 and beyond from reaching the network node 1310. Thus, an outage affecting stations from tap 2 and beyond is created.

Accordingly, in various implementations in accordance with the present disclosure, networks incorporating ideal taps may incorporate various measures and/or solutions for detecting and handling tap-related failures and/or outages. For example, networks incorporating ideal taps may be configured to utilize redundancy split signals to overcome tap-related failures and/or outages caused thereby. Networks incorporating ideal taps may also be configured to utilize redundancy nodes to overcome tap-related failures and/or outages caused thereby. Use of such measures allows for minimizing the failure group, such as only to the failed taps and limits outage only to network devices (e.g., CPEs) connected from the failed tap. Examples of such solutions are described below.

Figure 14:
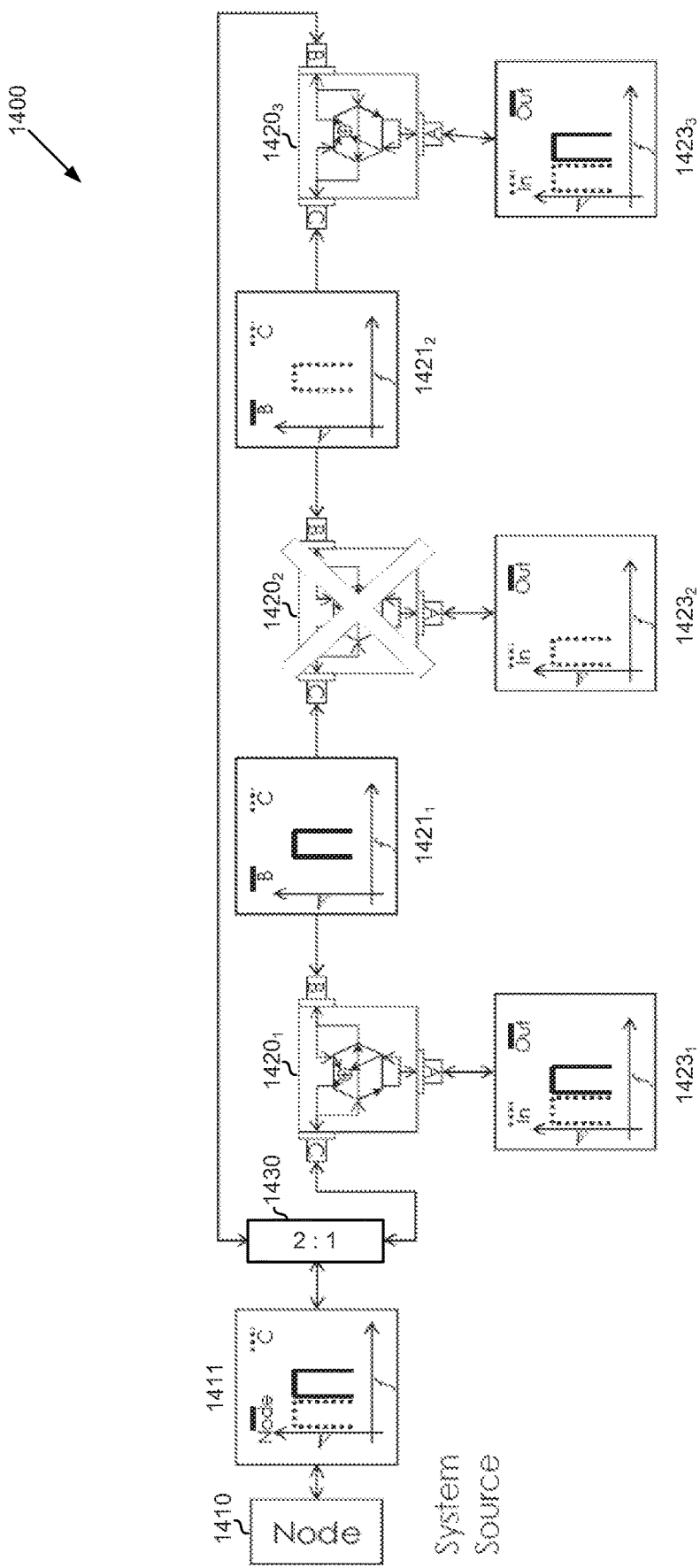
FIG. 14 illustrates an example cable network incorporating ideal taps, with the network configured to support redundancy and outage resolution based on use of split signals.

FIG. 14 illustrates an example cable network incorporating ideal taps, with the network configured to support redundancy and outage resolution based on use of split signals. Shown in FIG. 14 is cable network 1400 (or a portion thereof).

As shown in FIG. 14, the portion of the cable network 1400 comprises a network node 1410 and three ideal taps $1420_1$-$1420_3$. In this regard, the cable network 1400 (and elements thereof, as shown in FIG. 14) may be similar to the cable network 1300 and corresponding (similarly named) elements thereof, for example.

The cable network 1400, however, is configured for detecting and handling tap-related failures and/or outages, particularly based on use of redundancy split signals. In this regard, with redundancy split signals based solutions, the network may incorporate redundant signal paths (and elements for supporting or enabling use of such paths), between at least some of the network nodes and an end of line from such nodes that comprise (the line's) taps, to enable communicating signals even when a failure occurs in one of the taps in the line. For example, signal splitters may be used downstream from the network nodes, to provide a signal path from the network nodes to the end of line.

In the particular implementation shown in FIG. 14, for example, signal splitter 1430 (e.g., a 2:1 splitter) is incorporated between the network node 1410 and the line comprising taps $1420_1$-$1420_3$. In this regard, the signal splitter 1430 may be a passive splitter allowing for splitting output (DS) signals from the network node 1410, and combining input (US) signals to the network node 1410. One leg (output) of the signal splitter 1430 is connected to the in-port (port C) of the first tap (tap $1420_1$, or tap 1) in the line, while the other leg of the splitter is connected to the out-port (port B) of the last tap (tap $1420_3$, or tap 3) in the line. This creates a circuit or loop of connectivity, for the chain of taps in the line, thus allowing continued operations (i.e., no outage) even if there was a failure in any of the taps.

For example, with reference to the failure scenario described with respect to FIG. 13, where tap 2 (i.e., tap $1420_2$) encounters a failure, the last tap (tap $1420_3$, or tap 3) may be reconfigured to communicate using the redundant signal path—e.g., receiving and sending signals via its out-port (port B) instead of its in-port (port C), as it would in normal operation, thus restoring service to all taps (except the failed tap). Once the failure at tap 2 is resolved, normal operation may be resumed—e.g., the last tap is reconfigured to resume communication of signals via the chain of taps, and thus receives and sends signals via its in-port (port C).

Figure 15:
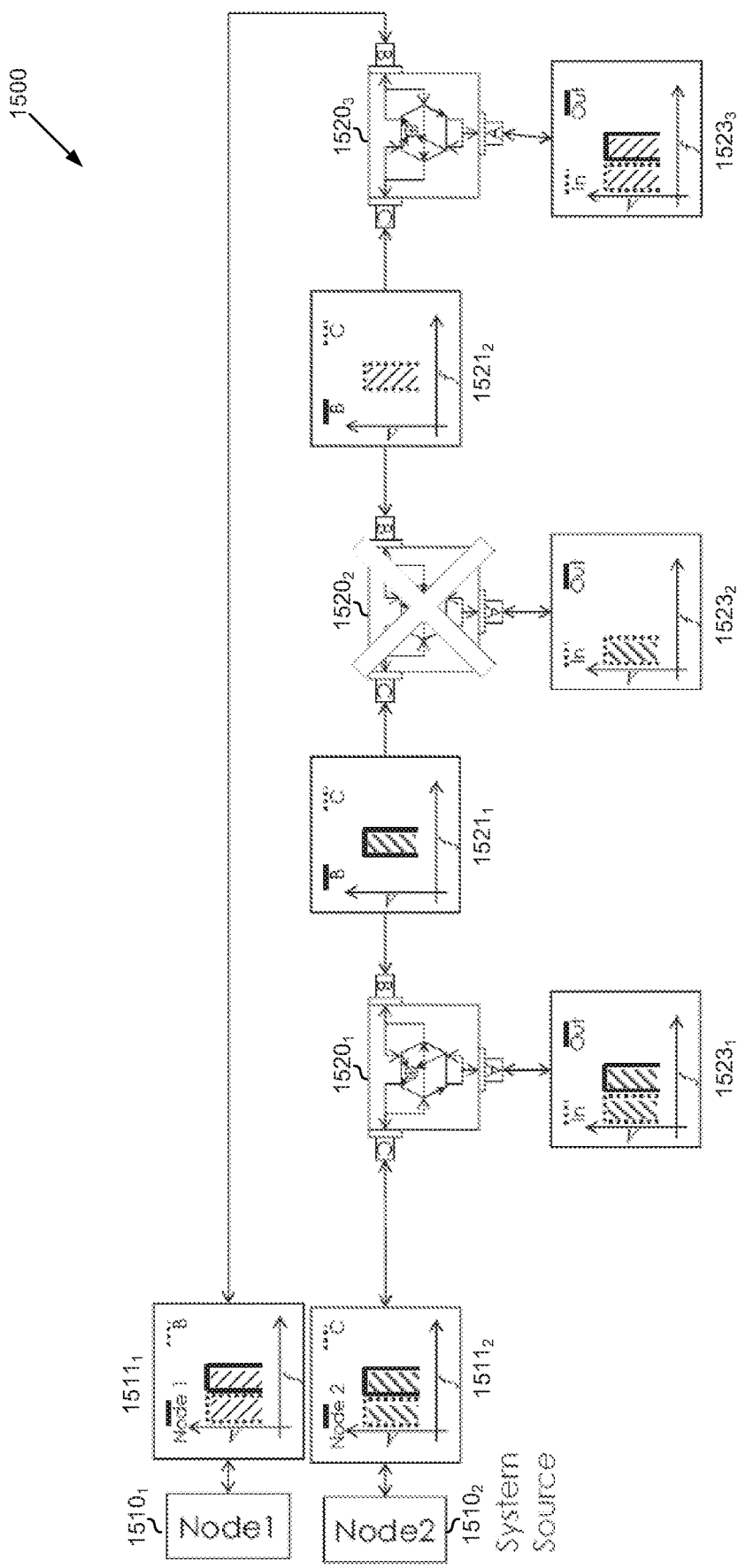
FIG. 15 illustrates an example cable network incorporating ideal taps, with the network configured to support redundancy and outage resolution based on use of spare nodes.

FIG. 15 illustrates an example cable network incorporating ideal taps, with the network configured to support redundancy and outage resolution based on use of spare nodes. Shown in FIG. 15 is cable network 1500 (or a portion thereof). As shown in FIG. 15, the portion of the cable network 1500 comprises network nodes $1510_1$ and $1510_2$ and three ideal taps $1520_1$-$1520_3$. In this regard, the cable network 1500 (and elements thereof, as shown in FIG. 15) may be similar to the cable network 1300 and corresponding (similarly named) elements thereof, for example, with the network node $1510_2$ performing the same functions of the network node 1310 in the cable network 1300.

The cable network 1500, however, is configured for detecting and handling tap-related failures and/or outages, particularly based on use of spare nodes to provide redundancy and outage resolution. In this regard, with spare node based redundancy and outage resolution, the network may incorporate spare nodes connected at particular points within the network, to ensure redundancy within particular sections of the network. For example, a spare network node may be deployed at or near a start of a line comprising a number of taps (e.g., being connected to the same point as node(s) driving this line), and may be connected to the end of this line, to enable communicating signals even when a failure occurs in one of the taps in the line. Such spare nodes may be connected, for example, to the same point in the network as the network node(s) driving (sourcing DS signals and sinking US signals) communicated within this line or may be located at a different location in the network (not shown).

For example, in the particular implementation shown in FIG. 15, the (spare) network node $1510_1$ is deployed at the position as the (main) network node $1510_2$, which drives the line/chain of taps comprising taps $1520_1$-$1520_3$. In this regard, the spare network node $1510_1$ is connected to the last tap in the line (tap $1520_3$, or tap 3), particularly to the out-port (port B) thereof. Such arrangement creates an alternative path and/or connectivity to taps within the line/chain of taps, from the end of the line, thus allowing continued operations (i.e., no outage) even if there was a failure in any of the taps within the line.

For example, with reference to the failure scenario described with respect to FIG. 13, where tap 2 (i.e., tap $1520_2$) encounters a failure, the last tap (tap $1520_3$, or tap 3) may be reconfigured to communicate using the alternative path using the spare network node $1510_1$—e.g., receiving and sending signals via its out-port (port B) instead of its in-port (port C), as it would in normal operation, while the first tap (tap $1520_1$ or tap 1) continues utilizing the main network node $1510_2$, thus restoring service to all taps (except the failed tap) in the line. Once the failure at tap 2 is resolved, normal operation may be resumed—e.g., the last tap is reconfigured to resume communication of signals via the chain of taps, and thus receives and sends signals via its in-port (port C).

Figure 16A:
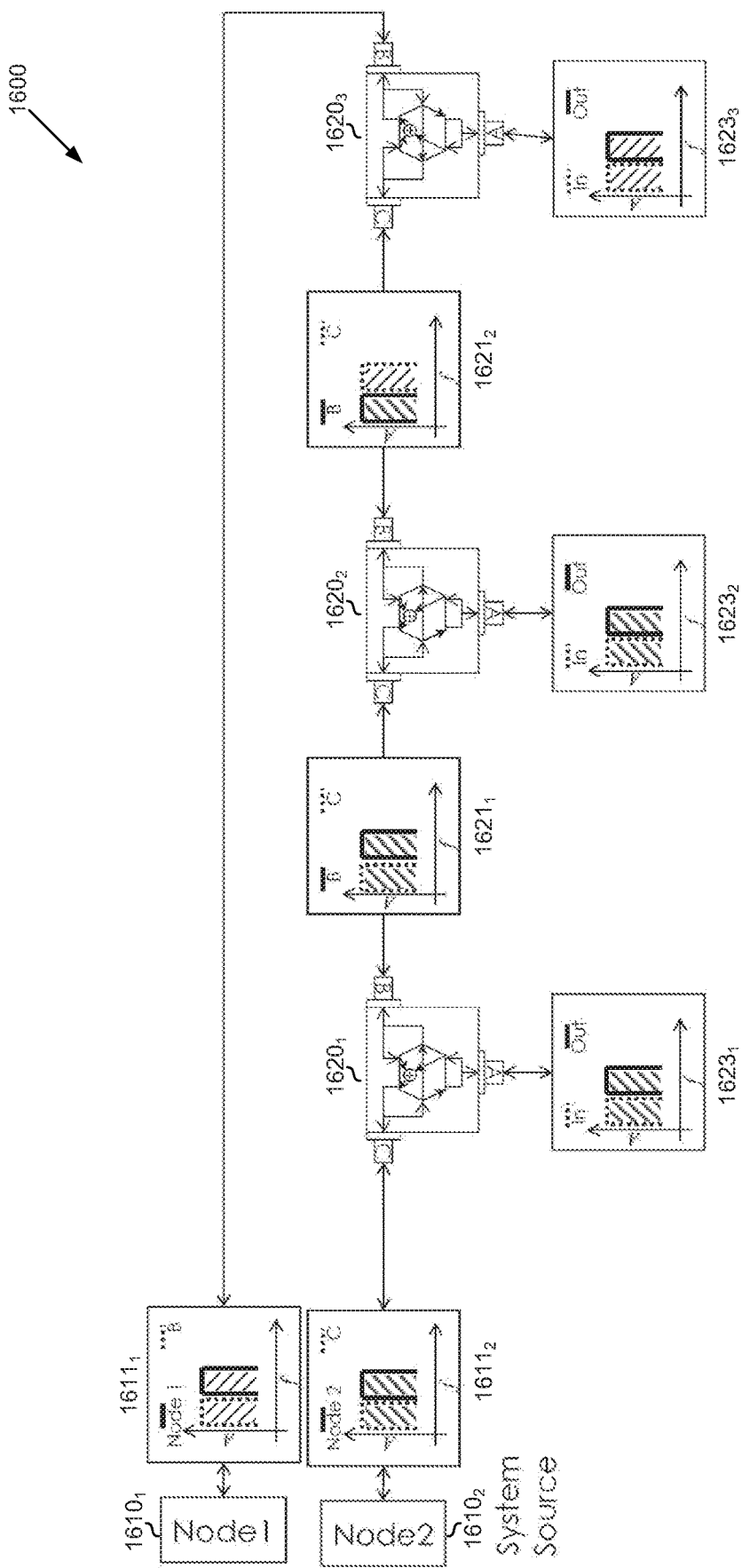
FIGS. 16A-16C illustrate an example cable network incorporating ideal taps, with the network configured to support use of an add/drop multiplexer (Mux).
Figure 16B:
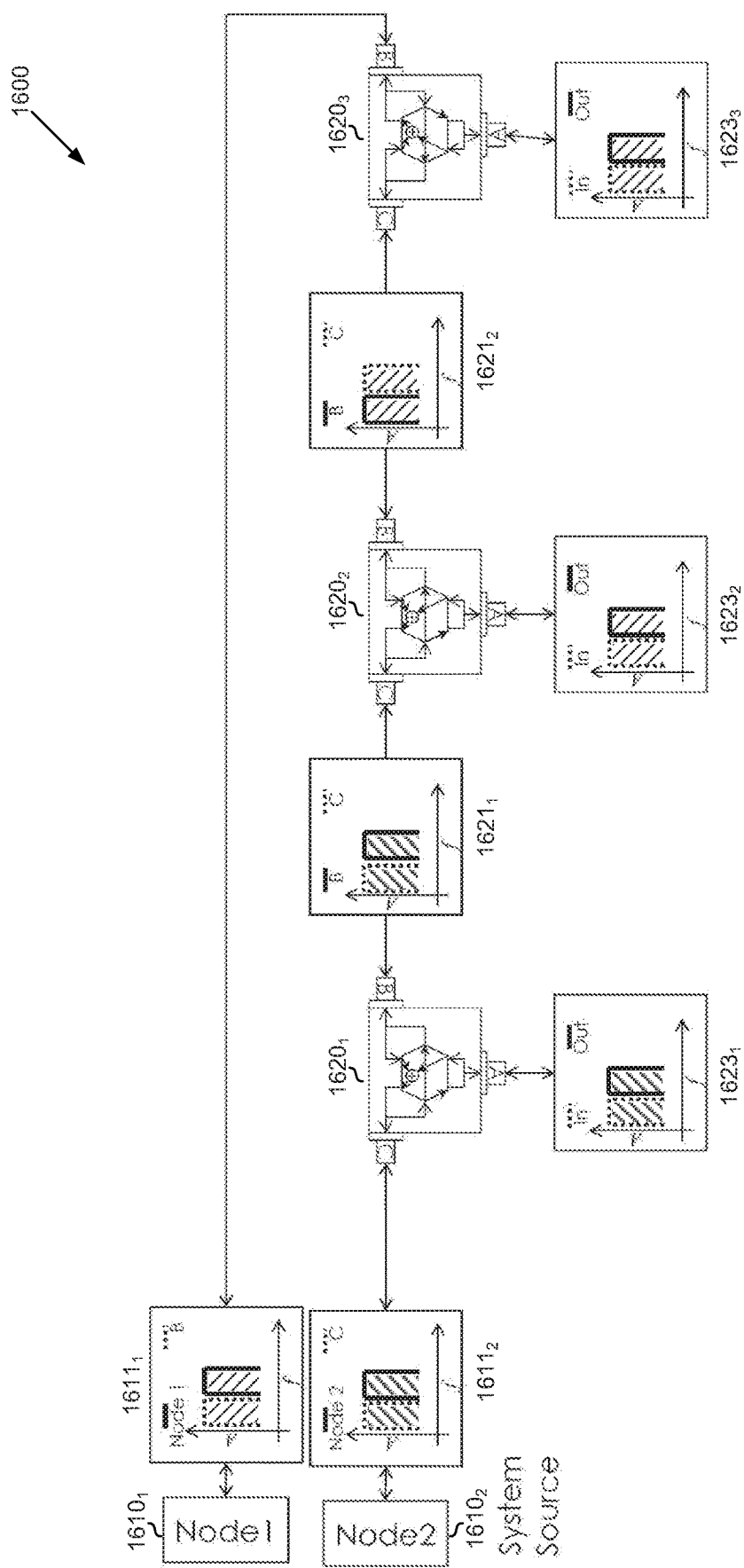
Figure 16C:
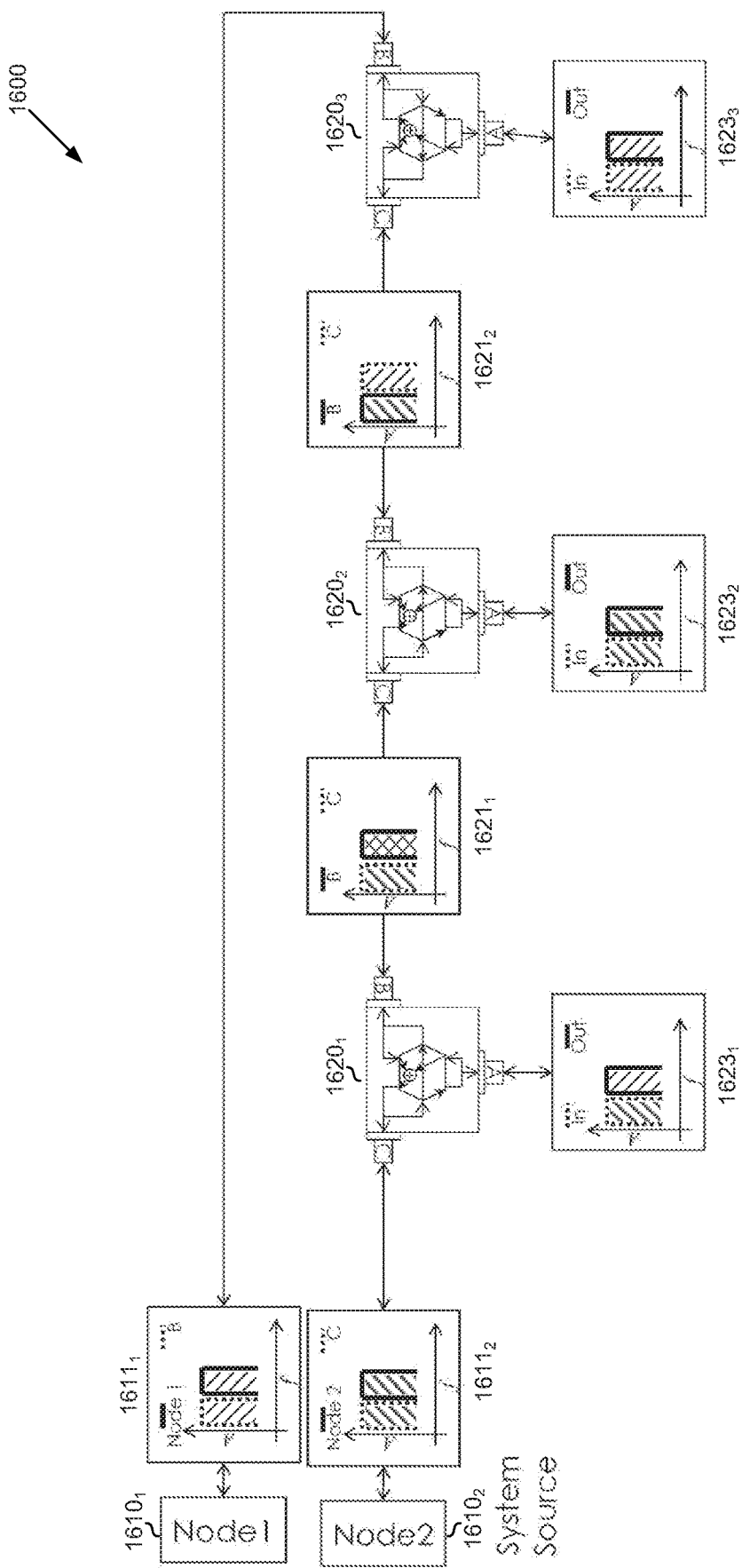

FIGS. 16A-16C illustrate an example cable network incorporating ideal taps, with the network configured to support use of add/drop multiplexer (Mux). Shown in FIG. 16A is cable network 1600 (or a portion thereof). As shown in FIG. 16A, the portion of the cable network 1600 comprises network nodes $1610_1$ and $1610_2$ and three ideal taps $1620_1$-$1620_3$.

The cable network 1600 (and elements thereof, as shown in FIG. 16A) may be similar to the cable network 1500 and corresponding (similarly named) elements thereof, for example. In this regard, as with the cable network 1500, the cable network 1600 may incorporate spare network nodes (e.g., the network node $1610_1$) which may be used in providing redundancy and outage resolution in certain situations (e.g., failure of particular taps). The cable network 1600, however, may also be configured for utilizing the spare nodes to improve and/or optimize performance in the network, by providing additional functions during normal operations (e.g., when there is no tap failure within the lines corresponding to the spare network nodes).

In the particular implementation shown in FIG. 16A, for example, the (spare) network node $1610_1$ is deployed at the position as the (main) network node $1610_2$, which drives the line/chain of taps comprising taps $1620_1$-$1620_3$. In this regard, as shown in FIG. 16A, the spare network node $1610_1$ is connected to the last tap in the line (tap $1620_3$, or tap 3), particularly to the out-port (port B) thereof, whereas the (main) network node $1610_2$ is connected to the first tap in the line (tap $1620_1$, or tap 3), particularly to the in-port (port C).

During normal operation—i.e., where there is no failure in any of the taps, rather than leaving the (spare) network node $1610_1$ idle, it may be used to support communication of signals within the line, such as by handling communications of signals to and/or from at least some of the taps. In other words, the nodes (main and spare) may be used concurrently, with the taps within the lines being split, at some tap, and grouped such that some of the taps may be served by one of the nodes and the remaining taps may be served by the other node.

For example, as shown in the particular use scenario illustrated in FIG. 16A, to enhance performance, taps 1 and 2 (i.e., taps $1620_1$ and $1620_1$) may be configured to send signals to and receive signals from the main network node $1610_2$, whereas tap 3 (i.e., tap $1620_3$) may be configured to send signals to and receive signals from the spare network node $1610_1$, as illustrated in the band assignments in corresponding frequency charts $1611_1$, $1611_2$, $1621_1$, $1621_2$, $1623_1$, $1623_2$, and $1623_3$.

Further, the grouping of taps to nodes, and/or signal band allocations handled thereby, may be dynamically (re-)configured, such as to increase and/or maximize bandwidth and meeting demands optimally and efficiently. Accordingly, as shown in FIG. 16B, when performance requirements may changes (e.g., due to changes in demands), the grouping of the taps and/or band allocation/assignment may be re-configured, and as such tap 2 may be configured to select the band(s) from spare network node $1610_1$, received/sent via tap 3, as illustrated in the modified band assignments in the frequency charts $1611_1$, $1611_2$, $1621_1$, $1621_2$, $1623_1$, $1623_2$, and $1623_3$.

Such adaptive configurability may also allow for supporting enhanced modes of operations, such as frequency-division duplexing (FDD). For example, as shown in FIG. 16C, the spectrum between any two taps may be in full duplex. Thus, in the example use scenario illustrated in FIG. 16C, tap 2 (i.e., tap $1620_2$) may be sending signals (from the (spare) network node $1610_1$) via its in-port (port C) while tap 1 (i.e., tap $1620_1$) may be sending signals (from the (main) network node $1610_2$) via its out-port (port B) over the same link, with the signals sent from both taps being in the same spectrum, as illustrated in the modified band assignments in the frequency charts $1611_1$, $1611_2$, $1621_1$, $1621_2$, $1623_1$, $1623_2$, and $1623_3$. This allows stations (e.g., CPEs) connected to tap 1, via its drop-port (port A) to receive from the (spare) network node $1610_1$, while stations (e.g., CPEs) connected to tap 2, via its drop-port (port A) to receive from the (main) network node $1610_2$, despite the fact that the (spare) network node $1610_1$ is not adjacent to tap 3.

Figure 17:
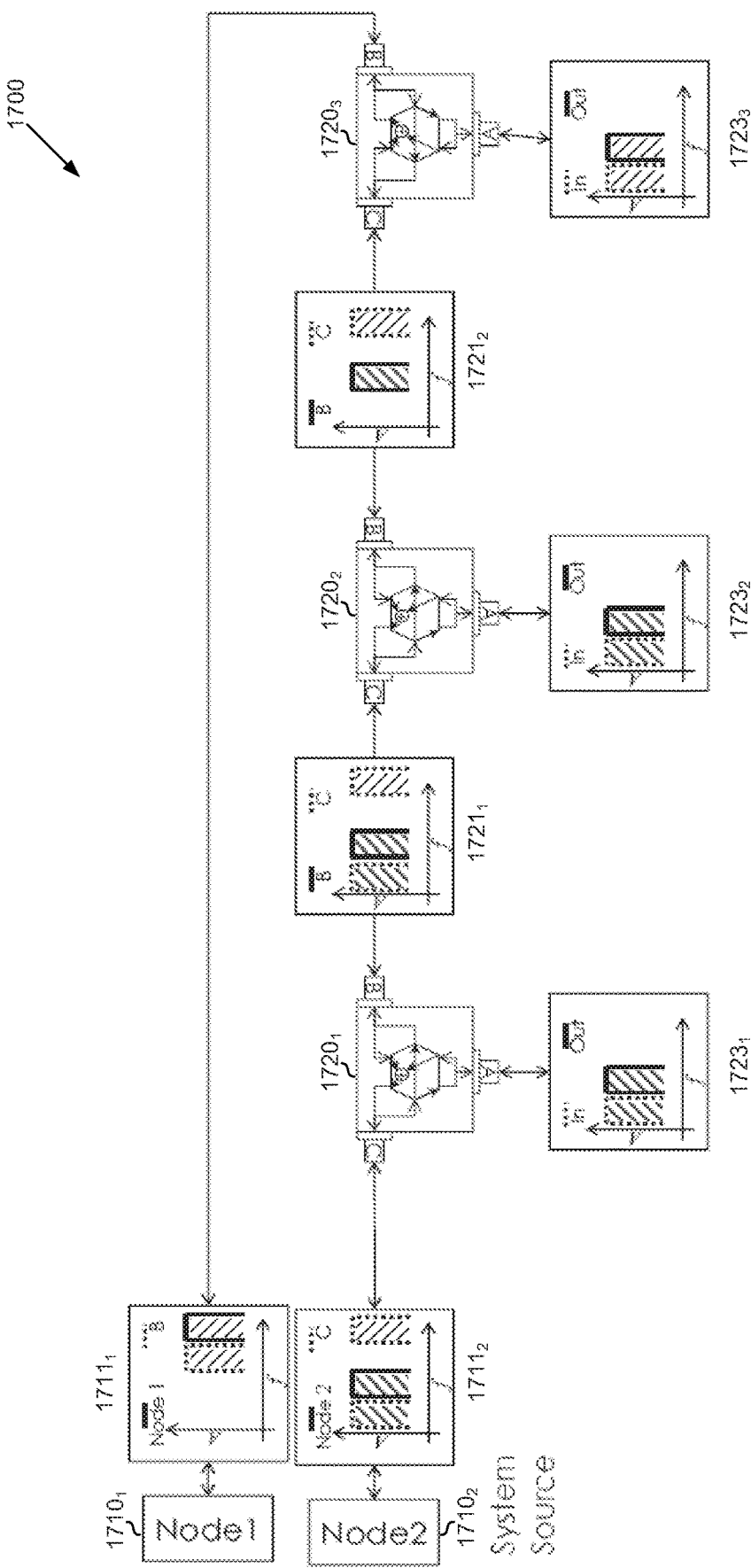
FIG. 17 illustrates an example cable network incorporating ideal taps, with the network configured to support use of an add/drop multiplexer (Mux) with band stacking.

FIG. 17 illustrates an example cable network incorporating ideal taps, with the network configured to support use of an add/drop multiplexer (Mux) with band stacking. Shown in FIG. 17 is cable network 1700 (or a portion thereof). As shown in FIG. 17, the portion of the cable network 1700 comprises network nodes $1710_1$ and $1710_2$ and three ideal taps $1720_1$-$1720_3$.

The cable network 1700 (and elements thereof, as shown in FIG. 17) may be similar to the cable network 1500 and corresponding (similarly named) elements thereof, for example. In this regard, as with the cable network 1500, the cable network 1700 may incorporate spare network nodes (e.g., the network node $1710_1$) which may be used in providing redundancy and outage resolution in certain situations (e.g., failure of particular taps). The cable network 1700, however, may also be configured for utilizing the spare nodes to improve and/or optimize performance in the network, by providing additional functions during normal operations (e.g., when there is no tap failure within the lines corresponding to the spare network nodes).

In the particular implementation shown in FIG. 17, for example, the (spare) network node $1710_1$ is deployed at the position as the (main) network node $1710_2$, which drives the line/chain of taps comprising taps $1720_1$-$1720_3$. In this regard, as shown in FIG. 17, the spare network node $1710_1$ is connected to the last tap in the line (tap $1720_3$, or tap 3), particularly to the out-port (port B) thereof, whereas the (main) network node $1710_2$ is connected to the first tap in the line (tap $1720_1$, or tap 3), particularly to the in-port (port C).

During normal operation—i.e., where there is no failure in any of the taps, rather than leaving the (spare) network node $1710_1$ idle, it may be used to support communication of signals within the line, such as by handling communications of signals to and/or from at least some of the taps, generally in similar manner as described with respect to the cable network 1600 for example. However, the cable network 1700 may be configured for support use of band stacking during such operations.

For example, as shown in the particular use scenario illustrated in FIG. 17, the (spare) network node $1710_1$ is configured to utilize a spectrum in higher band(s) than band(s) used by the (main) network node $1710_2$, as illustrated in corresponding frequency charts $1711_1$ and $1711_2$. Further, each of the taps may be configured to pass spectrum from the (main) network node $1710_2$ from its in-port (port C) to its out-port (port B), and to pass spectrum from the (spare) network node $1710_1$ from its out-port (port B) to its in-port (port C), as illustrated in corresponding frequency charts $1721_1$ and $1721_2$. In addition, each of the taps may be configured be pass the band(s) from the (spare) network node $1710_1$ or the band(s) from the (main) network node $1710_2$ via its drop-port (port A shown, though as noted with respect to FIG. 13, a tap could have multiple drop ports), as illustrated in corresponding frequency charts $1723_1$, $1723_2$, and $1723_3$.

The band(s) may or may not be frequency shifted at the drop ports. Further, in some instances, the band(s) at the drop ports may be partially constructed from spectrum from both of the (spare) network node $1710_1$ and the (main) network node $1710_2$, to allow support of different services, and doing so concurrently. For example, the (spare) network node $1710_1$ may provide video services while the (main) network node $1710_2$ may provide data services.

An example system for handling tap-related failures in a cable network, in accordance with the present disclosure, may comprise one or more circuits for use in a network element of the cable network, where the one or more circuits are configured to support handling tap-related failures in at least one chain of the cable network. The chain may comprises at least one network node and a plurality of taps, where the at least one network node is configured for transmitting downstream (DS) signals and receiving upstream (US) signals communicated within the cable network. When a tap-related failure occurs at a tap from the plurality of taps, the one or more circuits are configured to enable bypassing the tap during communication of signals to and/or from a section of the chain that is affected by the tap-related failure, and at least one other tap of the plurality of taps of the chain is re-configured to handle signals based on the bypassing of the tap.

In an example implementation, the affected section of the chain comprises remaining one or more taps of the plurality of taps positioned after the tap within the chain.

In an example implementation, the one or more circuits are configured to communicate the signals, when bypassing the tap, to an end of the chain.

In an example implementation, the network element comprises a splitter configured to route signals to selectively forward signals between the network node and one or both of a start of the chain and the affected section of the chain.

In an example implementation, the network element comprises a second network node configured for transmitting downstream (DS) signals and receiving upstream (US) signals corresponding to the affected section of the chain.

In an example implementation, each tap comprises a plurality of ports that comprises at least an input port configured for receiving downstream (DS) signals from and transmitting upstream (US) signals to one or more nodes upstream from the tap within the cable network, an output port configured for transmitting downstream (DS) signals to and receiving upstream (US) signals from one or more nodes downstream from the tap within the cable network, and one or more drop ports for receiving signals from and transmitting signals to a user device associated with the cable network.

In an example implementation, each tap comprises one or more processing circuits configured for handling signals received and transmitted via the tap, based on predefined tap performance criteria. The particular predefined tap performance criteria may comprise one or more of high return loss, high port-to-port isolation, and high port-to-port gain.

In an example implementation, re-configuring the at least one other tap comprises re-assigning functions of one or more ports of the at least one other tap.

In an example implementation, re-assigning the functions of the one or more ports of the at least one other tap comprises re-assigning a port as an input port to enable handling of signals communicated for the bypassing of the tap.

In an example implementation, re-assigning the functions of the one or more ports of the at least one other tap comprises re-assigning a port as an output port to enable handling of signals communicated for the bypassing of the tap.

An example system for handling tap-related failures in a cable network, in accordance with the present disclosure, may comprise a plurality of taps, a first network node, and a second network node. Each of the first network node and the second network node is configured for transmitting downstream (DS) signals and receiving upstream (US) signals communicated. One or more taps of the plurality of taps are configured to communicate signals via one of the first network node and the second network node, and one or more remaining taps of the plurality of taps are configured to communicate signals via other one of the first network node and the second network node. One or more of the first network node, the second network node, and the plurality of taps is configured to adjust assignment of the plurality of taps to the first network node and the second network node based on network related conditions.

In an example implementation, the plurality of taps is arranged as a cascading chain of taps.

In an example implementation, one of the first network node and the second network node is configured to communicate signals to a start of the chain, and other one of the first network node and the second network node is configured to communicate signals to an end of the chain.

In an example implementation, the network related conditions comprise tap-related failure, and the assignment of the plurality of taps to the first network node and the second network node is adjusted based on the tap-related failure to bypass a tap at which a tap-related failure occurs.

In an example implementation, adjusting the assignment of the plurality of taps to the first network node and the second network node comprises re-configuring at least one tap.

In an example implementation, re-configuring the at least one tap comprises re-assigning functions of one or more ports of the at least one other tap.

In an example implementation, re-assigning the functions of the one or more ports of the at least one tap comprises re-assigning a port as an input port to enable handling of signals communicated for the bypassing of the tap.

In an example implementation, re-assigning the functions of the one or more ports of the at least one tap comprises re-assigning a port as an output port to enable handling of signals communicated for the bypassing of the tap.

In an example implementation, each tap comprises a plurality of ports that comprises at least an input port configured for receiving downstream (DS) signals from and transmitting upstream (US) signals to one or more nodes upstream from the tap within the cable network, an output port configured for transmitting downstream (DS) signals to and receiving upstream (US) signals from one or more nodes downstream from the tap within the cable network, and one or more drop ports for receiving signals from and transmitting signals to a user device associated with the cable network.

In an example implementation, each tap comprises one or more processing circuits configured for handling signals received and transmitted via the tap, based on predefined tap performance criteria, where the particular predefined tap performance criteria comprises one or more of high return loss, high port-to-port isolation, and high port-to-port gain.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for handling tap-related failures in a cable network, the system comprising:
one or more circuits for use in a network element of the cable network, the one or more circuits being configured to support handling tap-related failures in at least one chain of the cable network;
wherein:
the chain comprises at least one network node and a plurality of taps;
the at least one network node is configured for transmitting downstream (DS) signals and receiving upstream (US) signals communicated within the cable network; and
wherein when a tap-related failure occurs at a tap from the plurality of taps:
the one or more circuits are configured to enable bypassing the tap during communication of signals to and/or from a section of the chain that is affected by the tap-related failure; and
at least one other tap of the plurality of taps of the chain is re-configured to handle signals based on the bypassing of the tap.

2. The system of claim 1, wherein the affected section of the chain comprises remaining one or more taps of the plurality of taps positioned after the tap within the chain.

3. The system of claim 1, wherein the one or more circuits are configured to communicate the signals, when bypassing the tap, to an end of the chain.

4. The system of claim 1, wherein the network element comprises a splitter configured to route signals to selectively forward signals between the network node and one or both of: a start of the chain, and the affected section of the chain.

5. The system of claim 1, wherein the network element comprises a second network node configured for transmitting downstream (DS) signals and receiving upstream (US) signals corresponding to the affected section of the chain.

6. The system of claim 1, wherein each tap comprises a plurality of ports that comprises at least:
- an input port configured for receiving downstream (DS) signals from and transmitting upstream (US) signals to one or more nodes upstream from the tap within the cable network;
- an output port configured for transmitting downstream (DS) signals to and receiving upstream (US) signals from one or more nodes downstream from the tap within the cable network; and
- one or more drop ports for receiving signals from and transmitting signals to a user device associated with the cable network.

7. The system of claim 1, wherein each tap comprises one or more processing circuits configured for handling signals received and transmitted via the tap, based on predefined tap performance criteria, the particular predefined tap performance criteria comprising one or more of high return loss, high port-to-port isolation, and high port-to-port gain.

8. The system of claim 1, wherein re-configuring the at least one other tap comprises re-assigning functions of one or more ports of the at least one other tap.

9. The system of claim 8, wherein re-assigning the functions of the one or more ports of the at least one other tap comprises re-assigning a port as an input port to enable handling of signals communicated for the bypassing of the tap.

10. The system of claim 8, wherein re-assigning the functions of the one or more ports of the at least one other tap comprises re-assigning a port as an output port to enable handling of signals communicated for the bypassing of the tap.

11. A system for handling tap-related failures in a cable network, the system comprising:
- a plurality of taps;
- a first network node; and
- a second network node;
- wherein:
  - each of the first network node and the second network node is configured for transmitting downstream (DS) signals and receiving upstream (US) signals communicated;
  - one or more taps of the plurality of taps are configured to communicate signals via one of the first network node and the second network node;
  - one or more remaining taps of the plurality of taps are configured to communicate signals via other one of the first network node and the second network node; and
  - one or more of the first network node, the second network node, and the plurality of taps is configured to adjust assignment of the plurality of taps to the first network node and the second network node based on network related conditions.

12. The system of claim 11, wherein the plurality of taps is arranged as a cascading chain of taps.

13. The system of claim 12, wherein one of the first network node and the second network node is configured to communicate signals to a start of the chain, and other one of the first network node and the second network node is configured to communicate signals to an end of the chain.

14. The system of claim 11, wherein the network related conditions comprise tap-related failure, and wherein the assignment of the plurality of taps to the first network node and the second network node is adjusted based on the tap-related failure to bypass a tap at which a tap-related failure occurs.

15. The system of claim 11, wherein adjusting the assignment of the plurality of taps to the first network node and the second network node comprises re-configuring at least one tap.

16. The system of claim 15, wherein re-configuring the at least one tap comprises re-assigning functions of one or more ports of the at least one other tap.

17. The system of claim 16, wherein re-assigning the functions of the one or more ports of the at least one tap comprises re-assigning a port as an input port to enable handling of signals communicated for the bypassing of the tap.

18. The system of claim 16, wherein re-assigning the functions of the one or more ports of the at least one tap comprises re-assigning a port as an output port to enable handling of signals communicated for the bypassing of the tap.

19. The system of claim 11, wherein each tap comprises a plurality of ports that comprises at least:
- an input port configured for receiving downstream (DS) signals from and transmitting upstream (US) signals to one or more nodes upstream from the tap within the cable network;
- an output port configured for transmitting downstream (DS) signals to and receiving upstream (US) signals from one or more nodes downstream from the tap within the cable network; and
- one or more drop ports for receiving signals from and transmitting signals to a user device associated with the cable network.

20. The system of claim 11, wherein each tap comprises one or more processing circuits configured for handling signals received and transmitted via the tap, based on predefined tap performance criteria, the particular predefined tap performance criteria comprising one or more of high return loss, high port-to-port isolation, and high port-to-port gain.

* * * * *